United States Patent
Gupta et al.

(10) Patent No.: US 12,182,618 B2
(45) Date of Patent: Dec. 31, 2024

(54) SYSTEM, APPARATUS AND METHOD FOR PROVIDING HARDWARE STATE FEEDBACK TO AN OPERATING SYSTEM IN A HETEROGENEOUS PROCESSOR

(71) Applicant: Intel Corporation, Santa Clara, CA (US)

(72) Inventors: Praveen Kumar Gupta, Hillsboro, OR (US); Avinash N. Ananthakrishnan, Portland, OR (US); Eugene Gorbatov, Hillsboro, OR (US); Stephen H. Gunther, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/322,636

(22) Filed: May 24, 2023

(65) Prior Publication Data
US 2023/0297424 A1    Sep. 21, 2023

Related U.S. Application Data

(62) Division of application No. 16/554,940, filed on Aug. 29, 2019, now Pat. No. 11,698,812.

(51) Int. Cl.
*G06F 9/48* (2006.01)
*G06F 1/08* (2006.01)
(Continued)

(52) U.S. Cl.
CPC .............. *G06F 9/4893* (2013.01); *G06F 1/08* (2013.01); *G06F 1/10* (2013.01); *G06F 1/3296* (2013.01); *G06F 1/324* (2013.01)

(58) Field of Classification Search
CPC ..................................... G06F 1/32; G06F 1/26
See application file for complete search history.

(56) References Cited

U.S. PATENT DOCUMENTS 5,163,153 A    11/1992   Cole et al.
5,522,087 A    5/1996    Hsiang
(Continued)

FOREIGN PATENT DOCUMENTS

EP    1 282 030        5/2003
KR    10-2018-0098904  9/2018

OTHER PUBLICATIONS

European Patent Office, Extended European Search Report dated Aug. 31, 2023 in European Patent Application No. 20858219.7 (13 pages).

(Continued)

*Primary Examiner* — Phil K Nguyen
(74) *Attorney, Agent, or Firm* — Nicholson De Vos Webster & Elliott LLP

(57) ABSTRACT

In one embodiment, a processor includes a power controller having a resource allocation circuit. The resource allocation circuit may: receive a power budget for a first core and at least one second core and scale the power budget based at least in part on at least one energy performance preference value to determine a scaled power budget; determine a first maximum operating point for the first core and a second maximum operating point for the at least one second core based at least in part on the scaled power budget; determine a first efficiency value for the first core based at least in part on the first maximum operating point for the first core and a second efficiency value for the at least one second core based at least in part on the second maximum operating point for the at least one second core; and report a hardware state change to an operating system scheduler based on the first efficiency value and the second efficiency value. Other embodiments are described and claimed.

18 Claims, 27 Drawing Sheets

(51) Int. Cl.
    *G06F 1/10*      (2006.01)
    *G06F 1/3296*    (2019.01)
    *G06F 1/324*     (2019.01)

(56) References Cited

U.S. PATENT DOCUMENTS

| | | |
|---|---|---|
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 9,378,536 B2 | 6/2016 | Park |
| 10,983,581 B2 | 4/2021 | Jahagirdar |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2009/0328055 A1 | 12/2009 | Bose |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2012/0060170 A1* | 3/2012 | Vajda .................. G06F 9/4893 718/104 |
| 2012/0079290 A1 | 3/2012 | Kumar |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0155081 A1* | 6/2013 | Khodorkovsky ....... G06F 1/329 345/522 |
| 2013/0346774 A1 | 12/2013 | Bhandaru et al. |
| 2014/0068290 A1 | 3/2014 | Bhandaru et al. |
| 2014/0189377 A1 | 7/2014 | Subbareddy et al. |
| 2014/0195829 A1 | 7/2014 | Bhandaru et al. |
| 2014/0208141 A1 | 7/2014 | Bhandaru et al. |
| 2014/0337853 A1* | 11/2014 | Kim ..................... G06F 9/5094 718/104 |
| 2016/0018882 A1 | 1/2016 | Rotem et al. |
| 2016/0062447 A1* | 3/2016 | Hsu ..................... G06F 1/3243 713/300 |
| 2016/0092274 A1 | 3/2016 | Singh et al. |
| 2016/0179117 A1* | 6/2016 | Eastep .................. G06F 1/324 700/291 |
| 2016/0342198 A1 | 11/2016 | Hsu et al. |
| 2017/0212575 A1 | 7/2017 | Wang |
| 2019/0042280 A1 | 2/2019 | Shanbhogue et al. |
| 2019/0339760 A1 | 11/2019 | Egger et al. |

OTHER PUBLICATIONS

Adileh et al., "Maximizing Heterogeneous Processor Performance Under Power Constraints," ACM Transactions on Architecture and Code Optimization (TACO), vol. 13, No. 3, Article 29, Sep. 17, 2016, pp. 1-23.

Intel Developer Forum, IDF2010, Opher Kahn et al., "Intel Next Generation Microarchitecture Codename Sandy Bridge: New Processor Innovations," Sep. 13, 2010, 58 pgs.

SPEC—Power and Performance, Design Overview V1.10, Standard Performance Information Corp., Oct. 21, 2008.

Intel Technology Journal, "Power and Thermal Management in the Intel Core duo Processor," May 15, 2006, pp. 109-122.

Anoop Iyer et al., "Power and Performance Evaluation of Globally Asynchronous Locally Synchronous Processors," 2002, pp. 1-11.

Greg Semeraro et al., "Hiding Synchrnoization Delays in a Gals Processor Microarchitecture," 2004, pp. 1-13.

Joan-Manuel Parcerisa, et al., "Efficient Interconnects for Clustered Microarchitecutres," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and voltage Control for a Multiple Clock Domain Architecture," 2022, pp. 1-12.

Greg Semeraro, "Energy-Efficient Processor Design Using Mulitple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini et al., "System-Level Dynamic Power Management," 1999, pp. 23-31.

Ravindra Jejurikar et al., "Leakage Aware dynamic Voltage Scaling for Real-Time Embedded Systems," 2004, pp. 275-280.

Ravindra Jejurikar et al., "Dynamic Slack Reclamation With Procrastination Scheduling in Real-time Embedded Systems," 2005, pp. 13-17.

R. Todling, et al., "Some Strategies For Kalman Filtering and Smoothing," 1996, pp. 1-21.

R.E. Kalman, "A new Approach to Linear Filtering and Prediction Problems," 1960, pp. 1-12.

Intel Corporation, "Intel 64 and IA-32 Architectures Software Developer's Manual," vol. 3B: System Programming Guide, Part 2, Apr. 2016, Chapter 14 Power and thermal Management (14.1-14.9.5), 39 pgs.

International Searching Authority, "Notification of Transmittal of the International Search Report and the Written Opinion of the International Searching Authority," mailed Oct. 30, 2020 in PCT Application No. PCT/US2020/043978.

(56) References Cited

OTHER PUBLICATIONS

European Patent Office, Communication Pursuant to Article 94(3) EPC dated Aug. 14, 2024 in European Patent Application No. 20858219.7 (9 pages).

* cited by examiner

| | Target Utilization Of Core Type A (%) | Target Utilization Of Core Type B (%) |
|---|---|---|
| 2510₀ | 0.1 | 0.12 |
| | 0.2 | 0.24 |
| | :: | :: |
| 2510ₙ | 1.0 | 1.0 |

2500

Target Utilization Table

FIG. 25

Efficiency Table 2600

| Frequency (GHz) 2612 | Efficiency Value 2614 |
|---|---|
| 1.0 | 80 |
| 1.2 | 90 |
| 1.6 | 100 |
| ••• | ••• |
| 3.0 | 60 |

$2610_0$ ... $2610_N$

Performance Table 2650

| Frequency (GHz) 2662 | Performance Value 2664 |
|---|---|
| 1.0 | ?? |
| 1.2 | ?? |
| 1.6 | ?? |
| ••• | ••• |
| 3.0 | ?? |

| Frequency Point | Voltage Core A | Voltage Core B |
|---|---|---|
| 0.1 | 0.12 | 0.12 |
| 0.2 | 0.24 | 0.24 |
| .. | .. | .. |
| 1.0 | 1.0 | 1.0 |

Voltage-Frequency Lookup Table

FIG. 27

SYSTEM, APPARATUS AND METHOD FOR PROVIDING HARDWARE STATE FEEDBACK TO AN OPERATING SYSTEM IN A HETEROGENEOUS PROCESSOR

CROSS-REFERENCE TO RELATED APPLICATIONS

The present application is a divisional of U.S. patent application Ser. No. 16/554,940, filed on Aug. 29, 2019, the content of which is hereby incorporated by reference.

TECHNICAL FIELD

Embodiments relate to a processor having an interface for providing scheduling information.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

BRIEF DESCRIPTION OF THE DRAWINGS

FIG. 25 is a block diagram of a utilization lookup table in accordance with an embodiment of the present invention.

FIG. 26 is a block diagram of efficiency and performance lookup tables in accordance with an embodiment of the present invention.

FIG. 27 is a block diagram of a voltage-frequency lookup table in accordance with an embodiment of the present invention.

DETAILED DESCRIPTION

Figure 1:
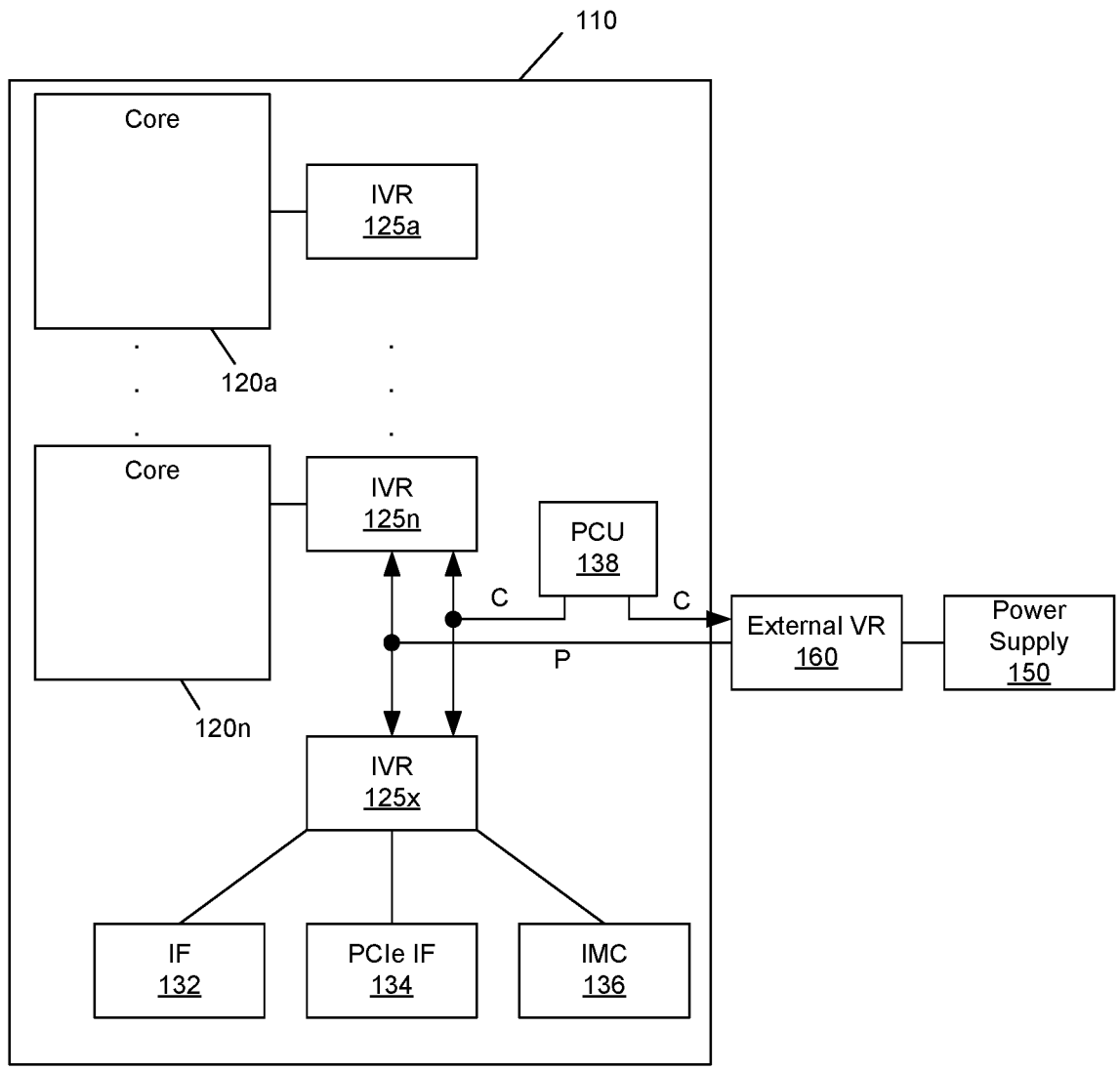
FIG. 1 is a block diagram of a portion of a system in accordance with an embodiment of the present invention.

In various embodiments, techniques are provided for managing power and thermal consumption in a heterogeneous (hetero) processor. As used herein the term "hetero processor" refers to a processor including multiple different types of processing engines. For example, a hetero processor may include two or more types of cores that have different microarchitectures, instruction set architectures (ISAs), voltage/frequency (VF) curves, and/or more broadly power/performance characteristics.

Optimal design/operating point of a heterogeneous processor (in terms of VF characteristics, instructions per cycle (IPC), functionality/ISA, etc.) is dependent on both inherent/static system constraints (e.g., common voltage rail) and a dynamic execution state (e.g., type of workload demand, power/thermal state, etc.). To extract power efficiency and performance from such architectures, embodiments provide techniques to determine/estimate present hardware state/capabilities and to map application software requirements to hardware blocks. With varying power/thermal state of a system, the relative power/performance characteristics of different cores change. Embodiments take these differences into account to make both local and globally optimal decisions. As a result, embodiments provide dynamic feedback of per core power/performance characteristics.

More specifically, embodiments provide closed loop control of resource allocation (e.g., power budget) and operating point selection based on the present state of heterogeneous hardware blocks. In embodiments, a hardware guided scheduling (HGS) interface is provided to communicate dynamic processor capabilities to an operating system (OS) based on power/thermal constraints. Embodiments may dynamically compute hardware (HW) feedback information, including dynamically estimating processor performance and energy efficiency capabilities. As one particular example, a lookup table (LUT) may be accessed based on underlying power and performance (PnP) characteristics of different core types and/or post-silicon tuning based on power/performance bias.

In addition, embodiments may determine an optimal operating point for the heterogeneous processor. Such optimal operating point may be determined based at least in part on a present execution scenario, including varying workload demands (performance, efficiency, responsiveness, throughput, IO response) of different applications, and shifting performance and energy efficiency capabilities of heterogeneous cores.

In embodiments, the dynamically computed processor performance and energy efficiency capabilities may be provided to an OS scheduler. The feedback information takes into account power and thermal constraints to ensure that current hardware state is provided. In this way, an OS scheduler can make scheduling decisions that improve overall system performance and efficiency. Note that this feedback is not dependent on workload energy performance preference (EPP) or other software input. Rather, it is based on physical constraints that reflect current hardware state.

In contrast, conventional power management mechanisms assume all cores to be of the same type, and thus estimate the maximum achievable frequency on each core to be same for a given power budget. This is not accurate, as different cores may have different power/performance capabilities individually and they may have different maximum frequency based on other platform constraints. And further, conventional power management algorithms assume the same utilization target for all cores when calculating performance state (P-state) and hence do not take into account the heterogeneity of an underlying architecture. Nor do existing techniques optimize the operating points with an objective of mapping a particular type of thread to a core type based on optimizing power or performance.

In general, a HGS interface provides dynamic processor capabilities to the OS based on power/thermal constraints. The OS takes this feedback as an input to a scheduling algorithm and maps workload demand to hetero compute units. The scheduler's mapping decisions may be guided by different metrics such as performance, efficiency or responsiveness, etc. The scheduling decisions in turn impact processor states, hence forming a closed loop dependence. Since workload demand, in terms of power/performance requirements, can vary by large margins, any change in scheduling decisions can cause a large shift in HGS feedback, leading to unacceptable stability issues. Embodiments provide techniques that are independent/resilient of the scheduling decisions or other software inputs from the operating system, and thus avoid these stability issues.

Although the following embodiments are described with reference to specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

In embodiments herein, PCU 138 may be configured to dynamically determine hardware feedback information regarding performance and energy efficiency capabilities of hardware circuits such as cores 120 and provide an interface to enable communication of this information to an OS scheduler, for use in making better scheduling decisions. To this end, PCU 138 may be configured to determine and store such information, either internally to PCU 138 or in another storage of system 100.

Furthermore, while FIG. 1 shows an implementation in which PCU 138 is a separate processing engine (which may be implemented as a microcontroller), understand that in some cases in addition to or instead of a dedicated power controller, each core may include or be associated with a power control agent to more autonomously control power consumption independently. In some cases a hierarchical power management architecture may be provided, with PCU 138 in communication with corresponding power management agents associated with each of cores 120.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Processors described herein may leverage power management techniques that may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, CA, to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Figure 2:
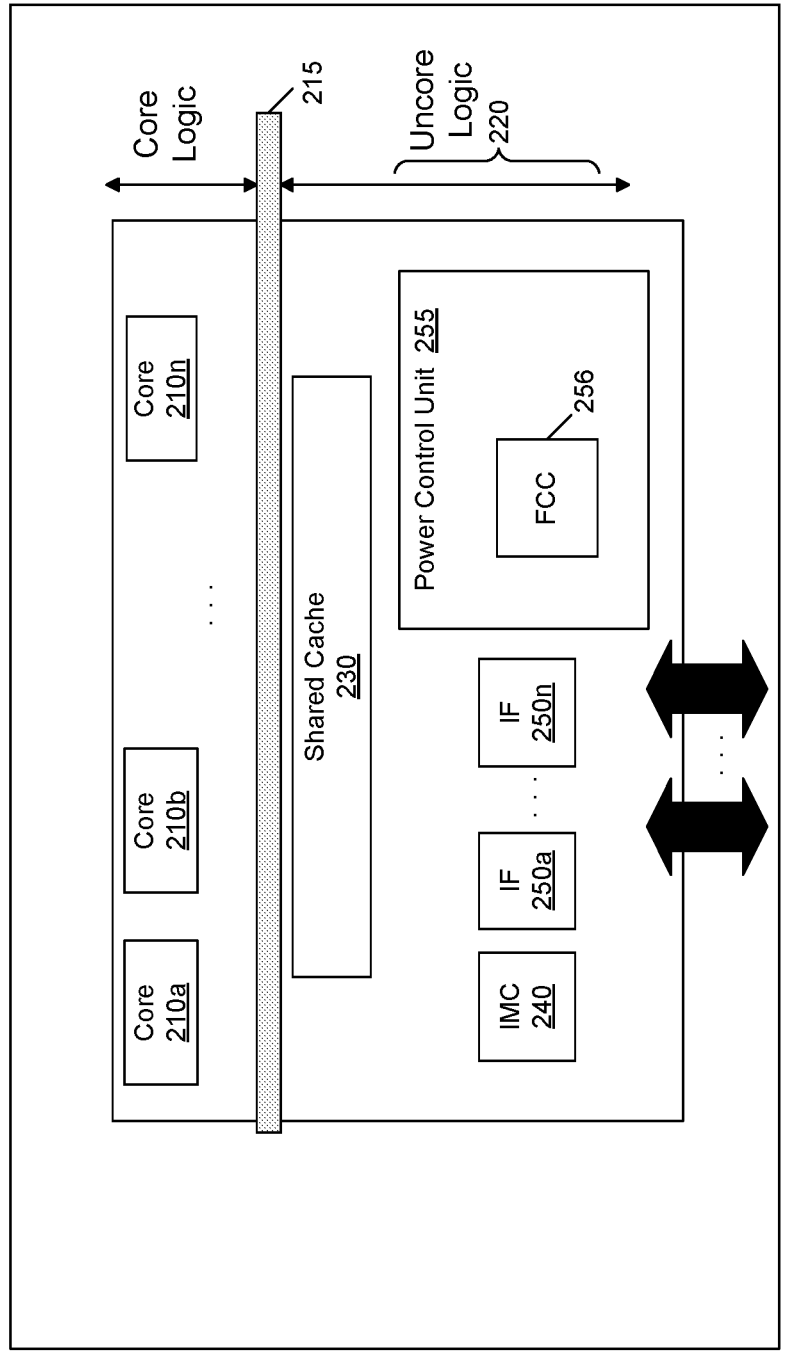
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload.

The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform power management techniques as described herein. In addition, power control unit 255 may include a feedback control circuit 256, configured to dynamically determine hardware feedback information and enable communication of such information to a scheduler as described herein.

In addition, by interfaces $250_a$-$250_n$, connection can be made to various off-chip components such as peripheral devices, mass storage and so forth. While shown with this particular implementation in the embodiment of FIG. 2, the scope of the present invention is not limited in this regard.

Figure 3:
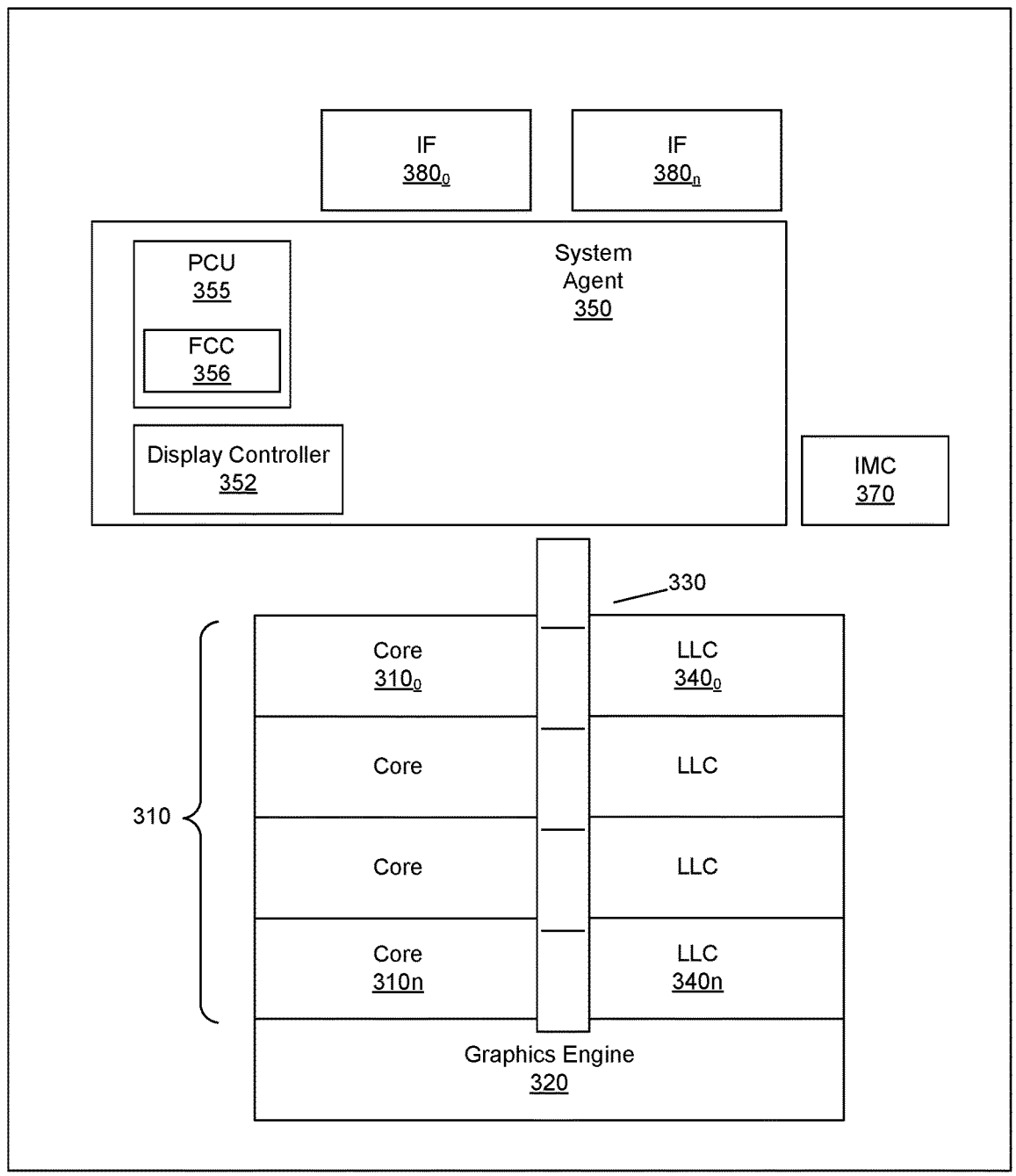
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355, which can include a feedback control circuit 356 to dynamically determine hardware feedback information regarding cores 310 and other execution engines and provide such information to a scheduler, as described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
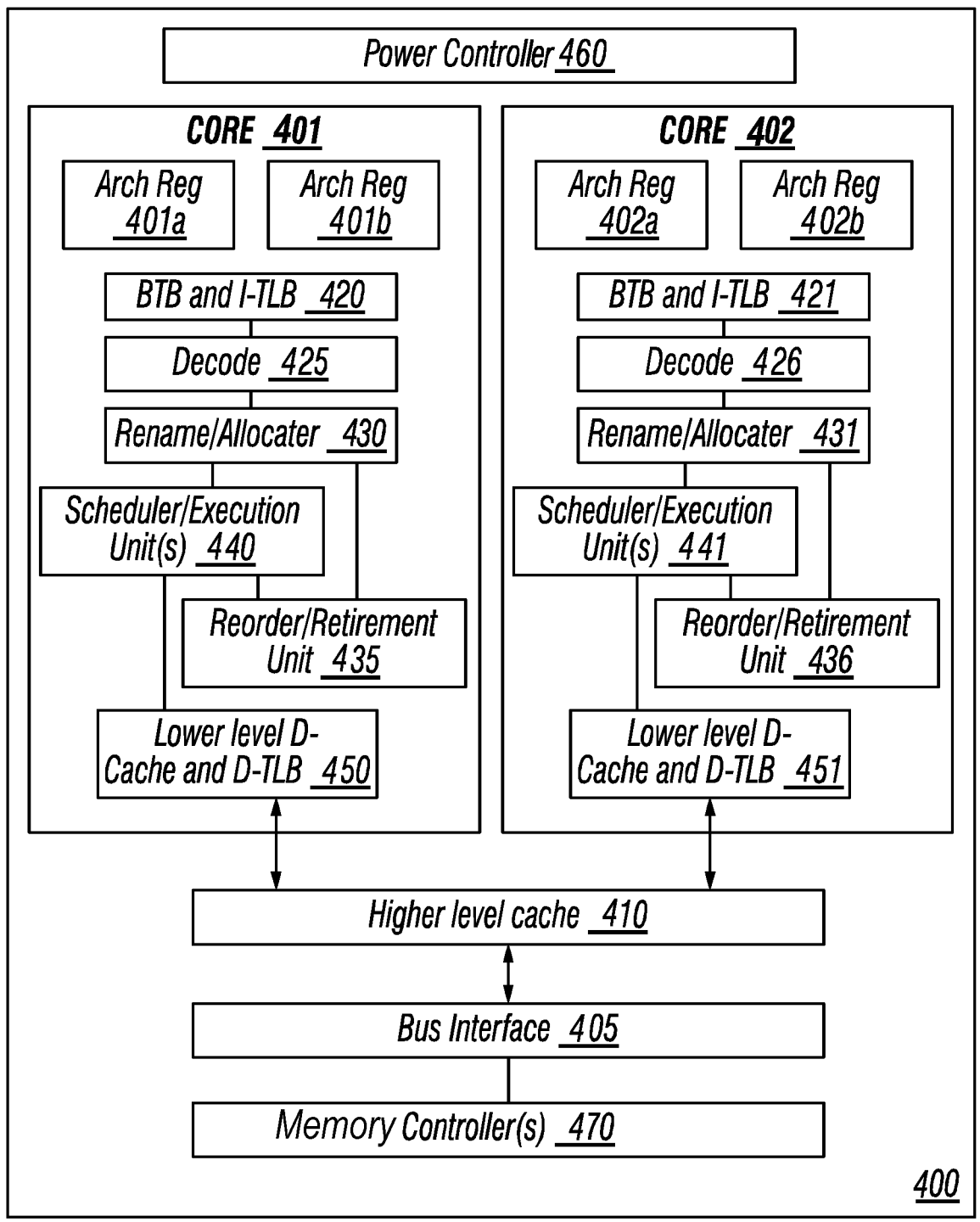
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401*a* and 401*b*. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401*a*, 401*b*, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
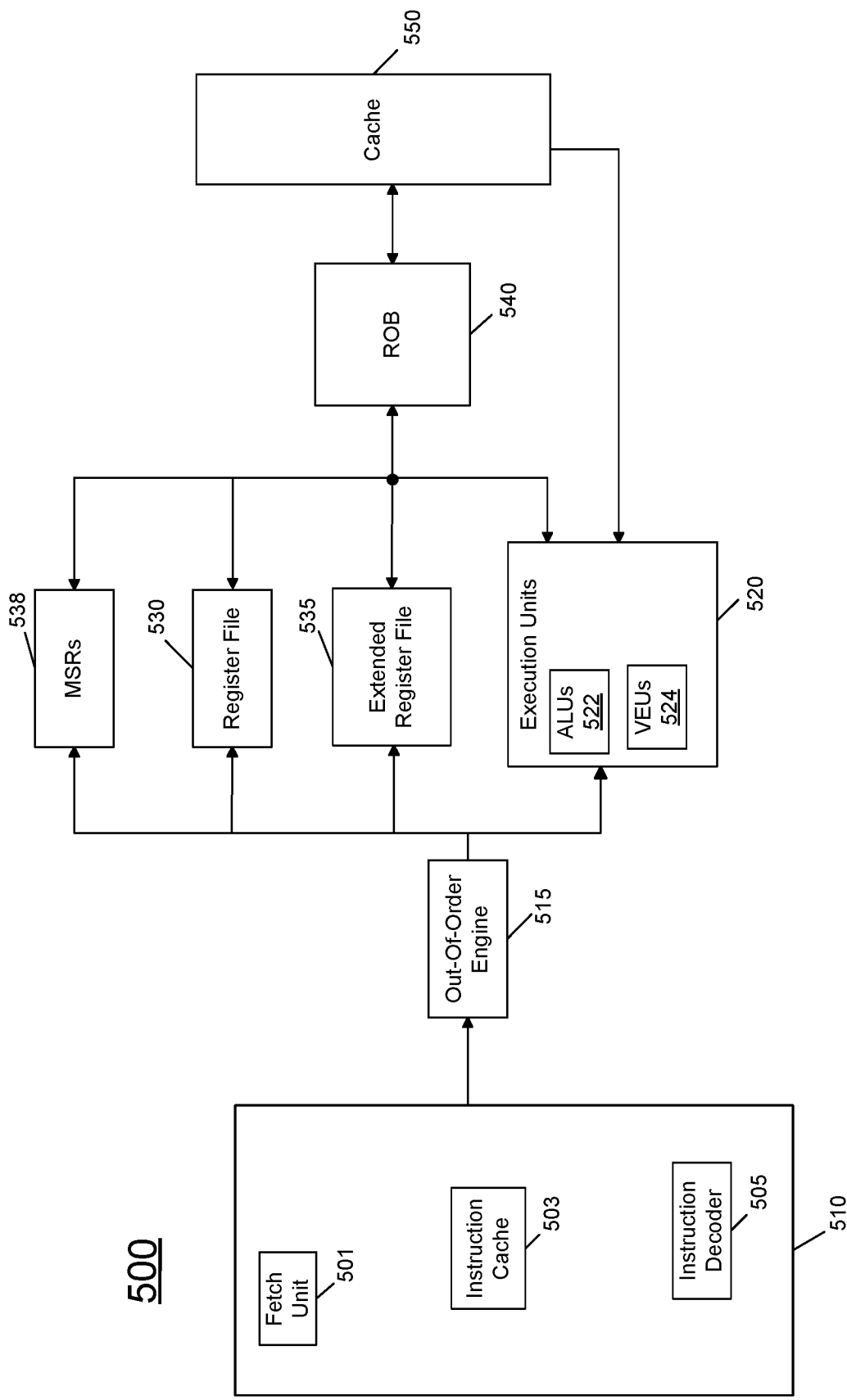
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. Note that performance and energy efficiency capabilities of core 500 may vary based on workload and/or processor constraints. As such, a power controller (not shown in FIG. 5) may dynamically determine feedback information including performance and energy efficiency capabilities, for use in scheduling decisions as described herein. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
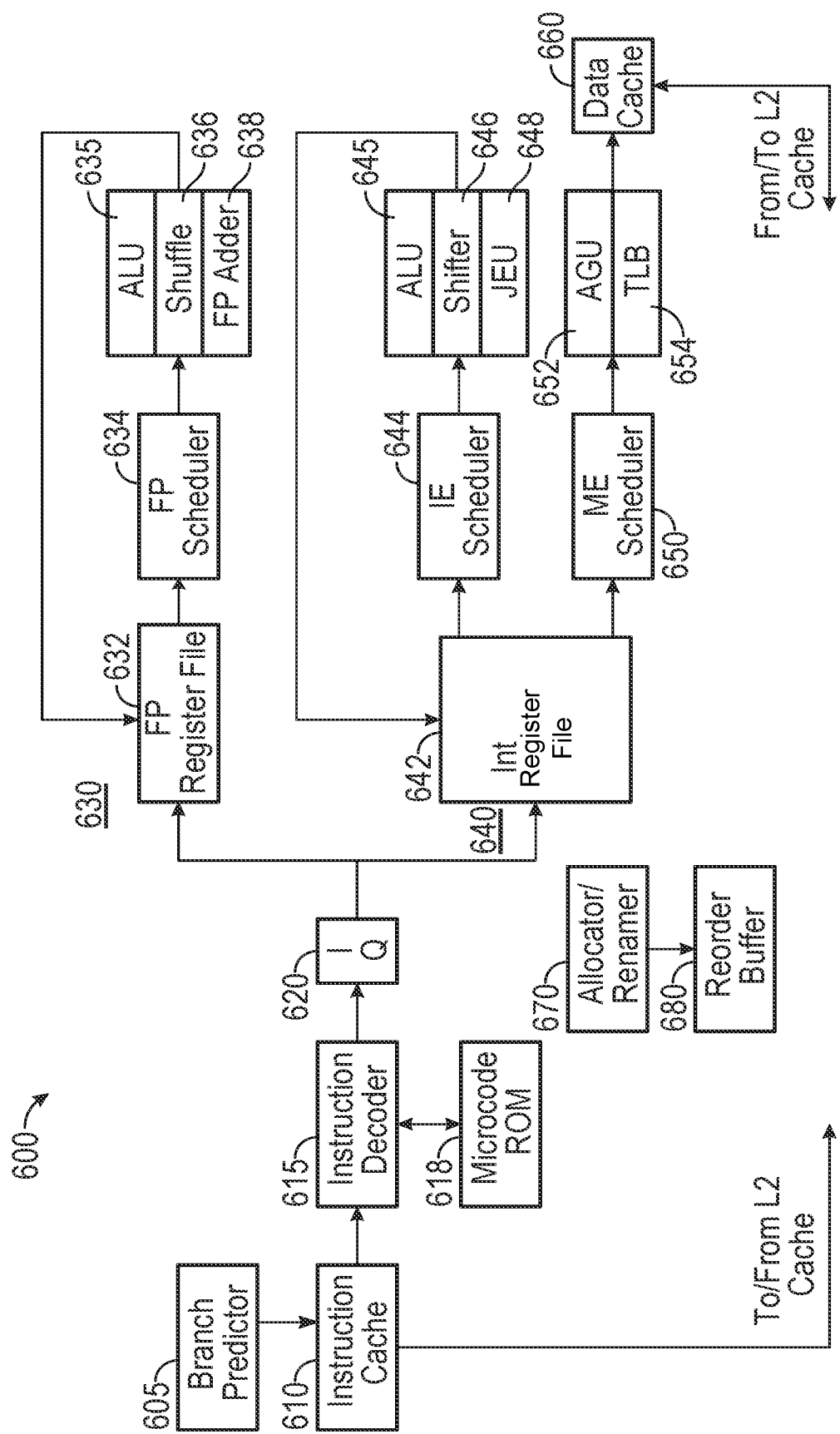
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Note that performance and energy efficiency capabilities of core 600 may vary based on workload and/or processor constraints. As such, a power controller (not shown in FIG. 6) may dynamically determine feedback information including performance and energy efficiency capabilities, for use in scheduling decisions as described herein. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
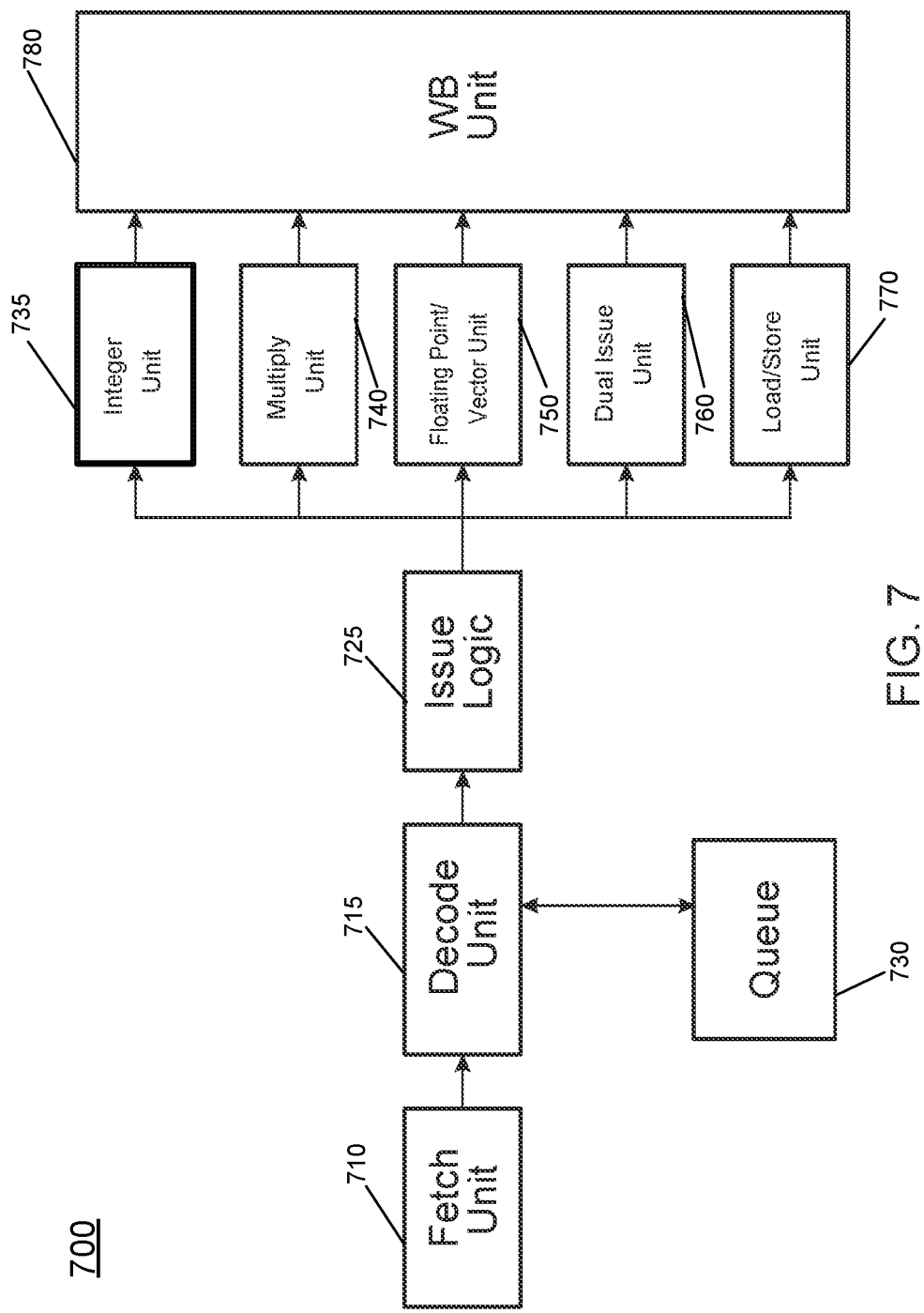
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, CA. In an implementation, an 8-stage pipeline may be provided that is configured to execute both 32-bit and 64-bit code. Core 700 includes a fetch unit 710 that is configured to fetch instructions, including an in-field self test instruction as described herein, and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
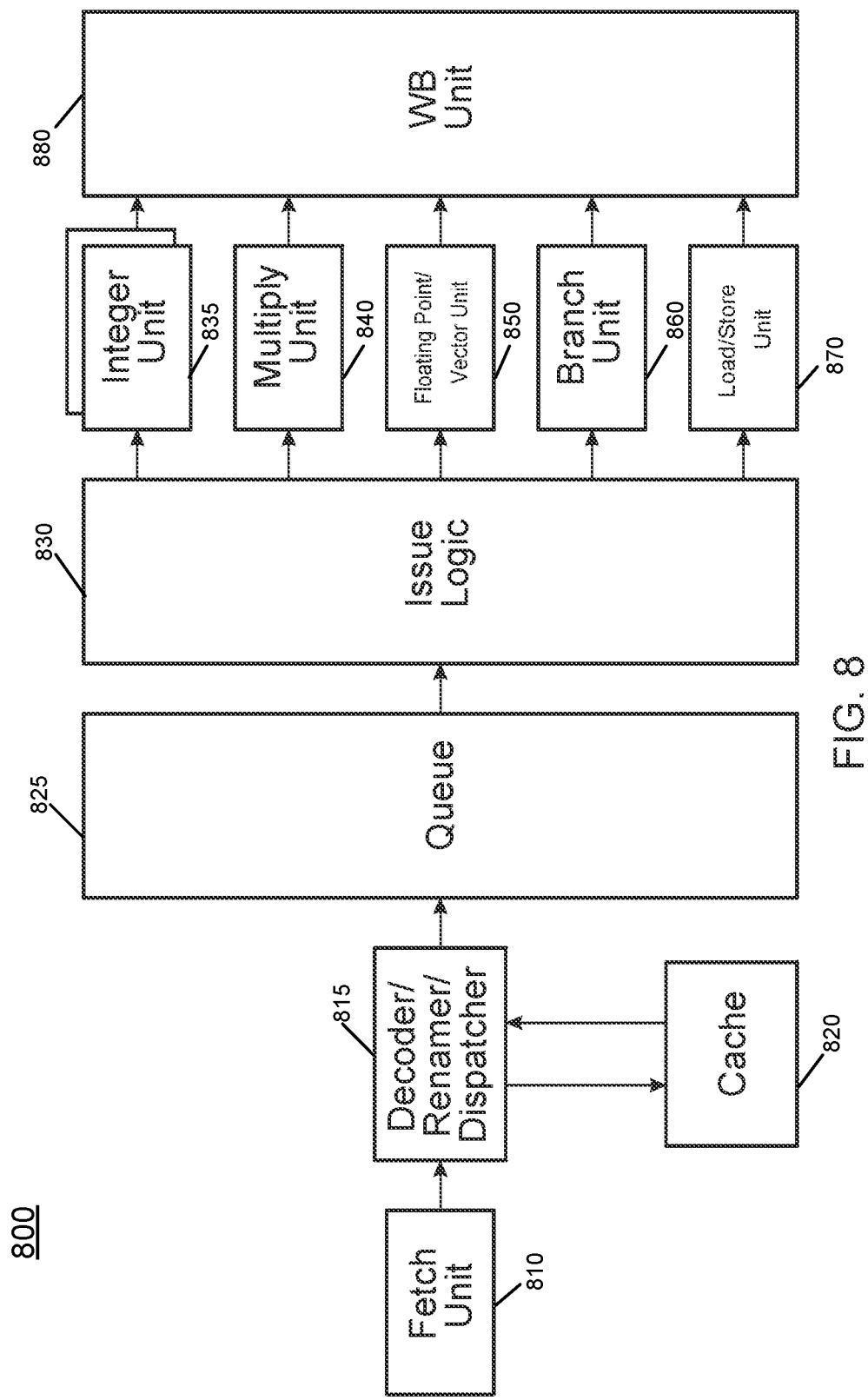
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions, including an in-field self test instruction as described herein, and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
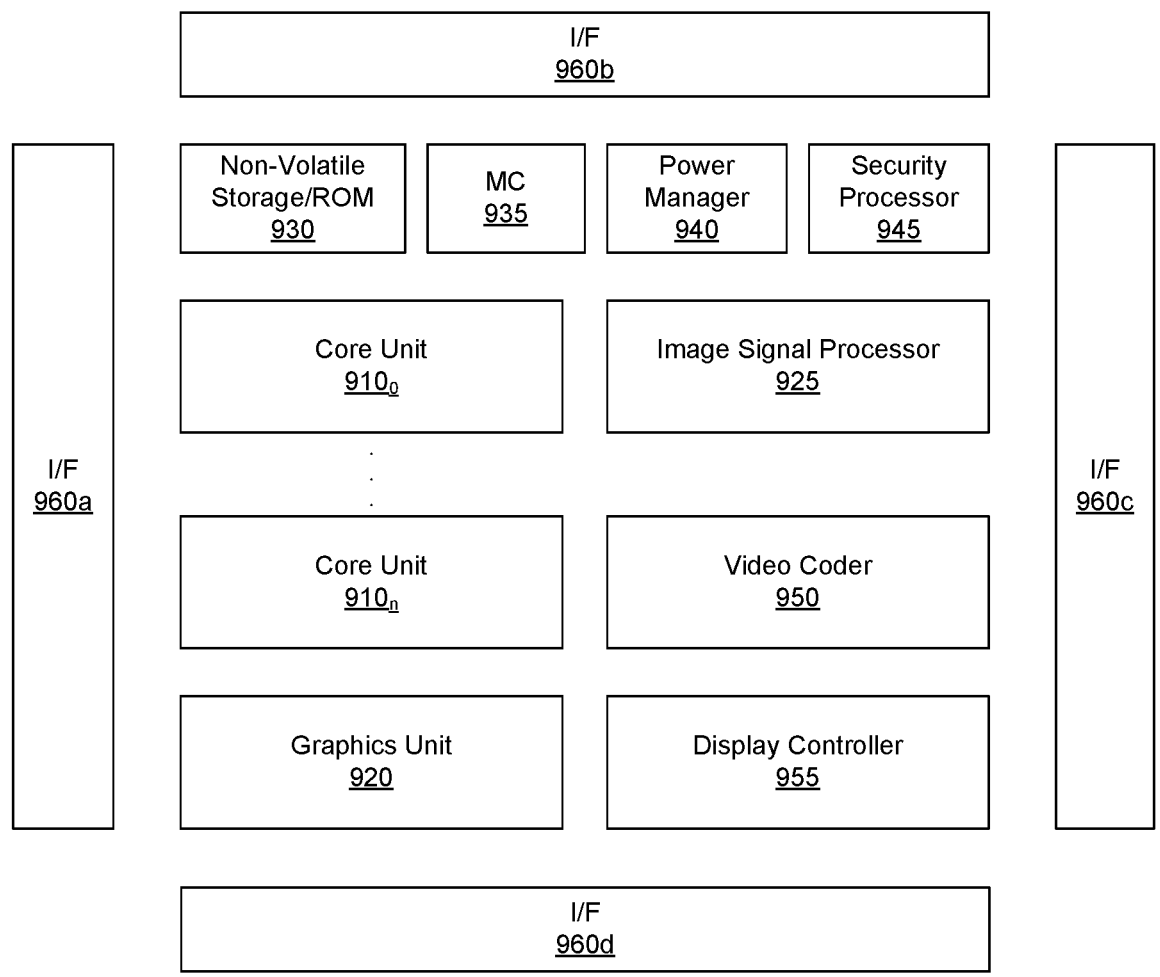
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, CA, an ARM-based design from ARM Holdings, Ltd. or licensee thereof or a MIPS-based design from MIPS Technologies, Inc. of Sunnyvale, CA, or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, or a vehicle computing system.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software, test patterns for the diagnostic self-testing described herein, or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein, including the dynamic determination of hardware feedback information, for communication to a scheduler.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
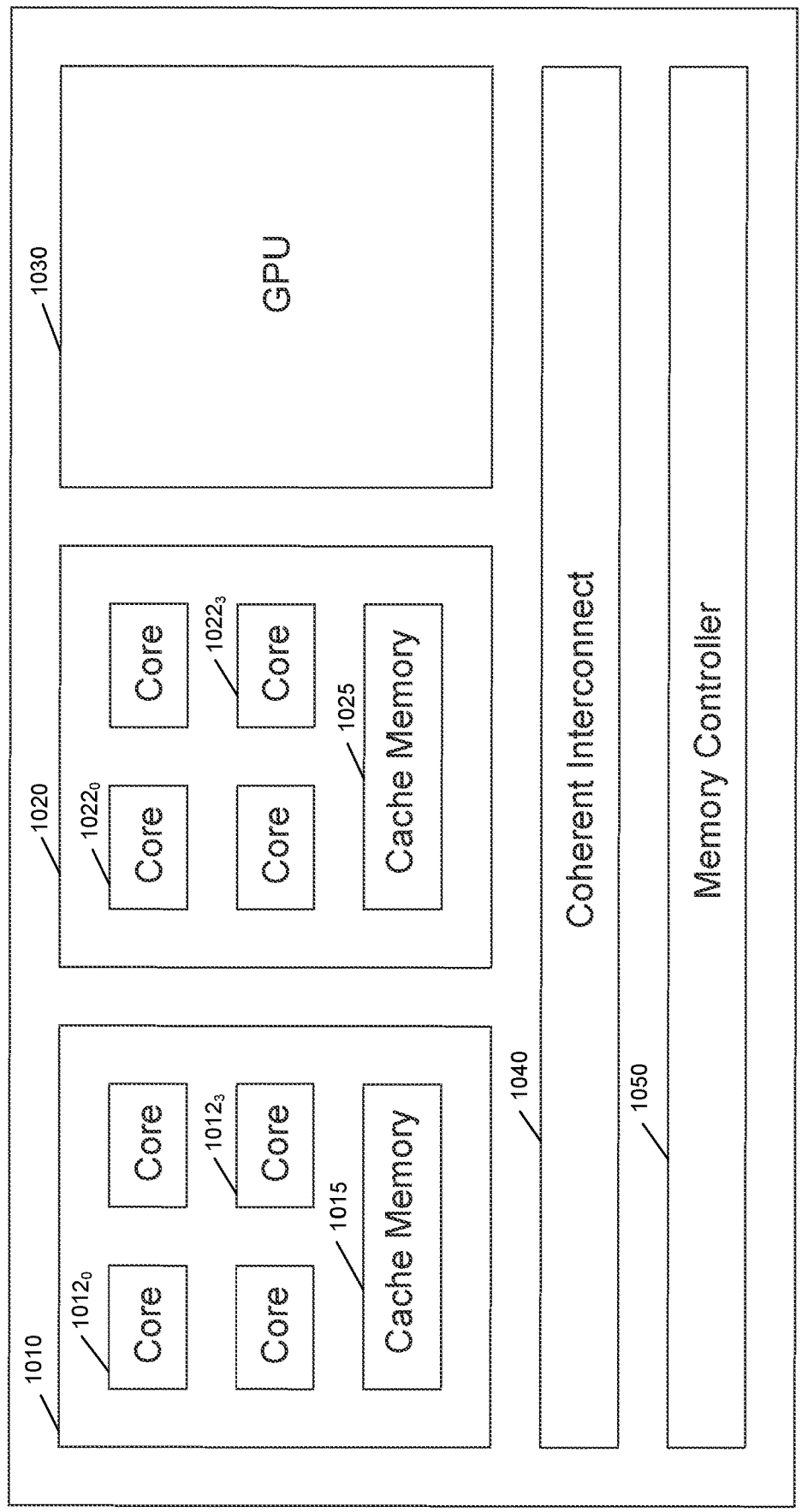
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device or vehicle computing system. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores that may interface with corresponding core perimeter logic via a mailbox interface as described herein. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
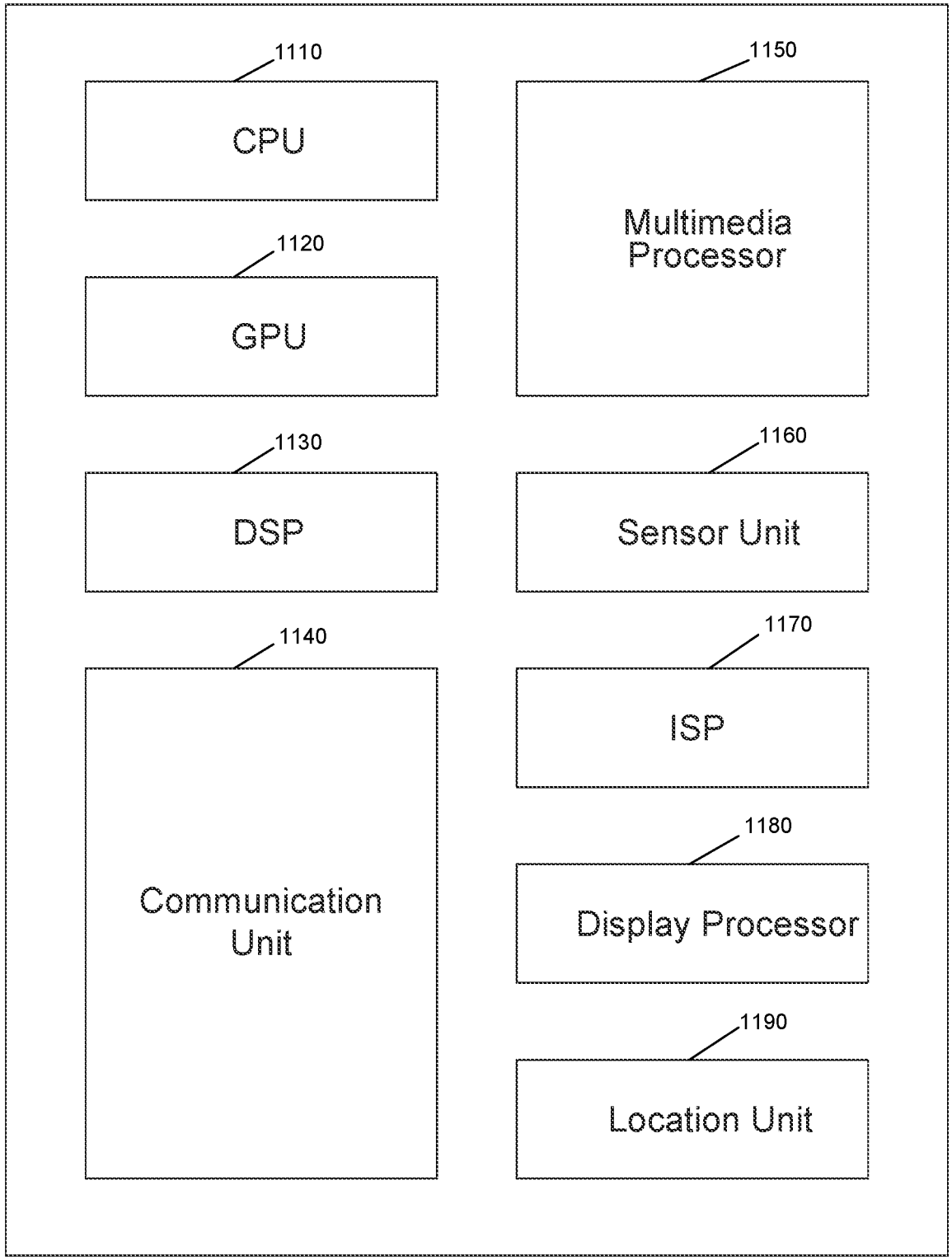
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs, vehicle computing systems, and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
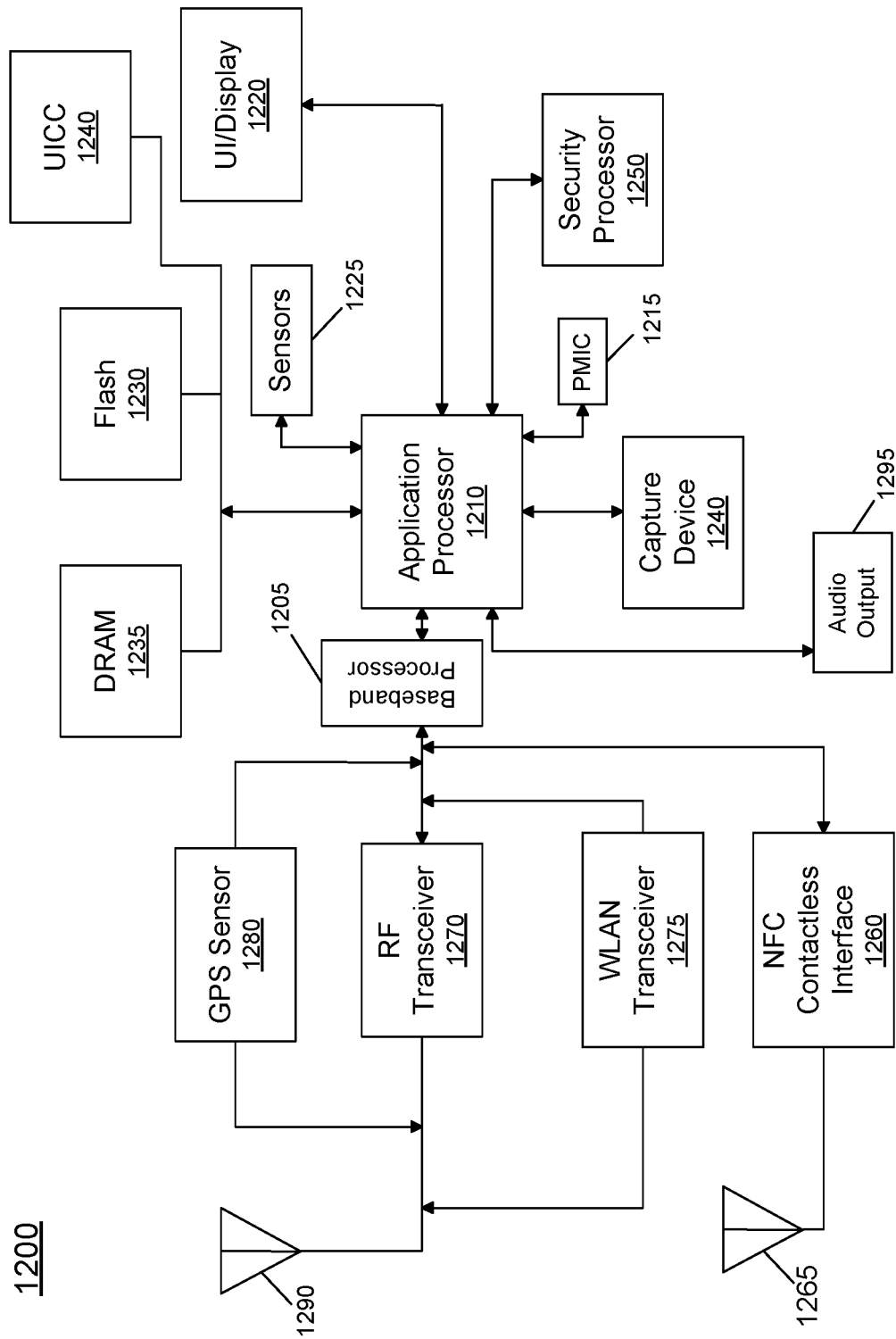
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may include a power controller as described herein, and may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
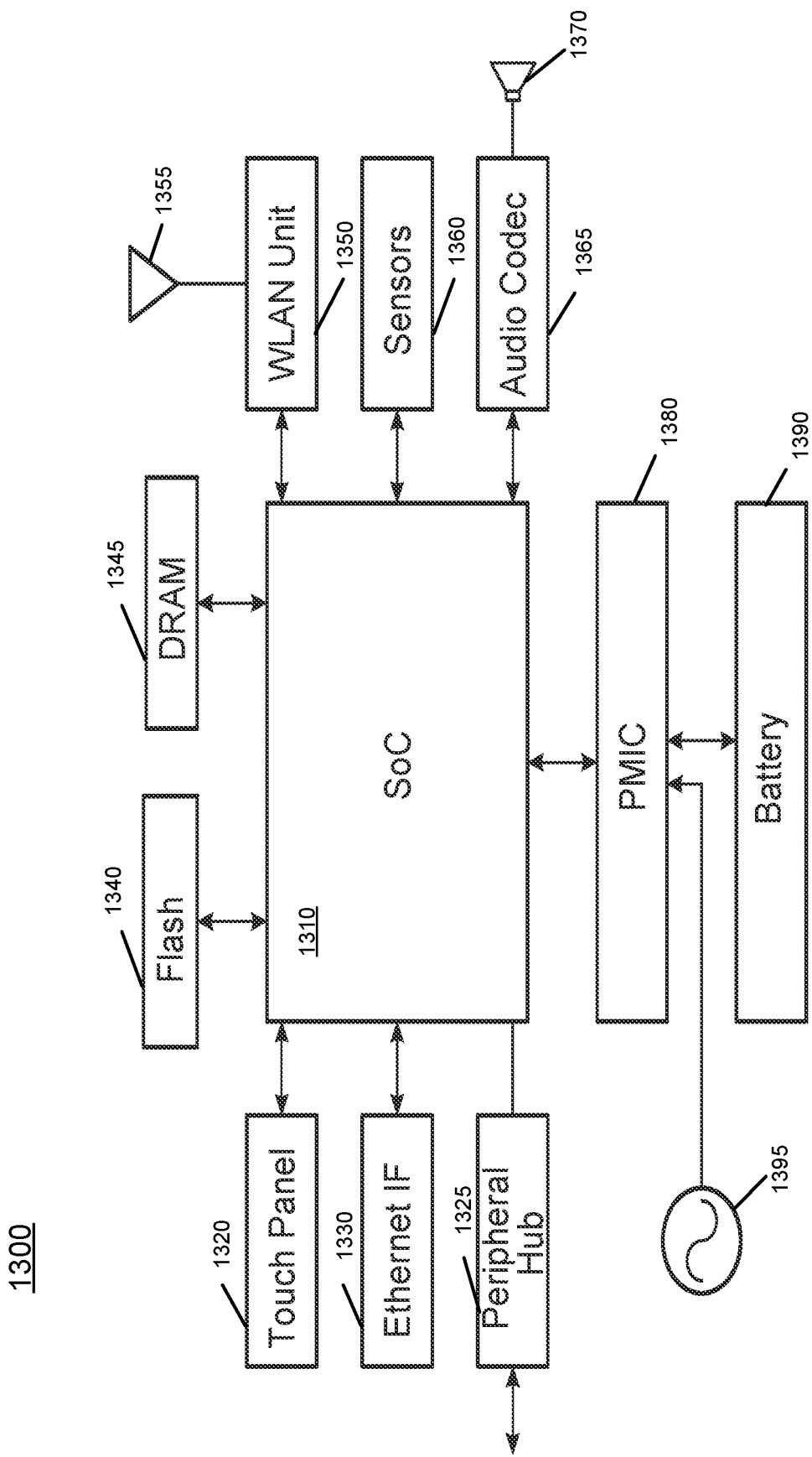
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and which may include a power controller as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
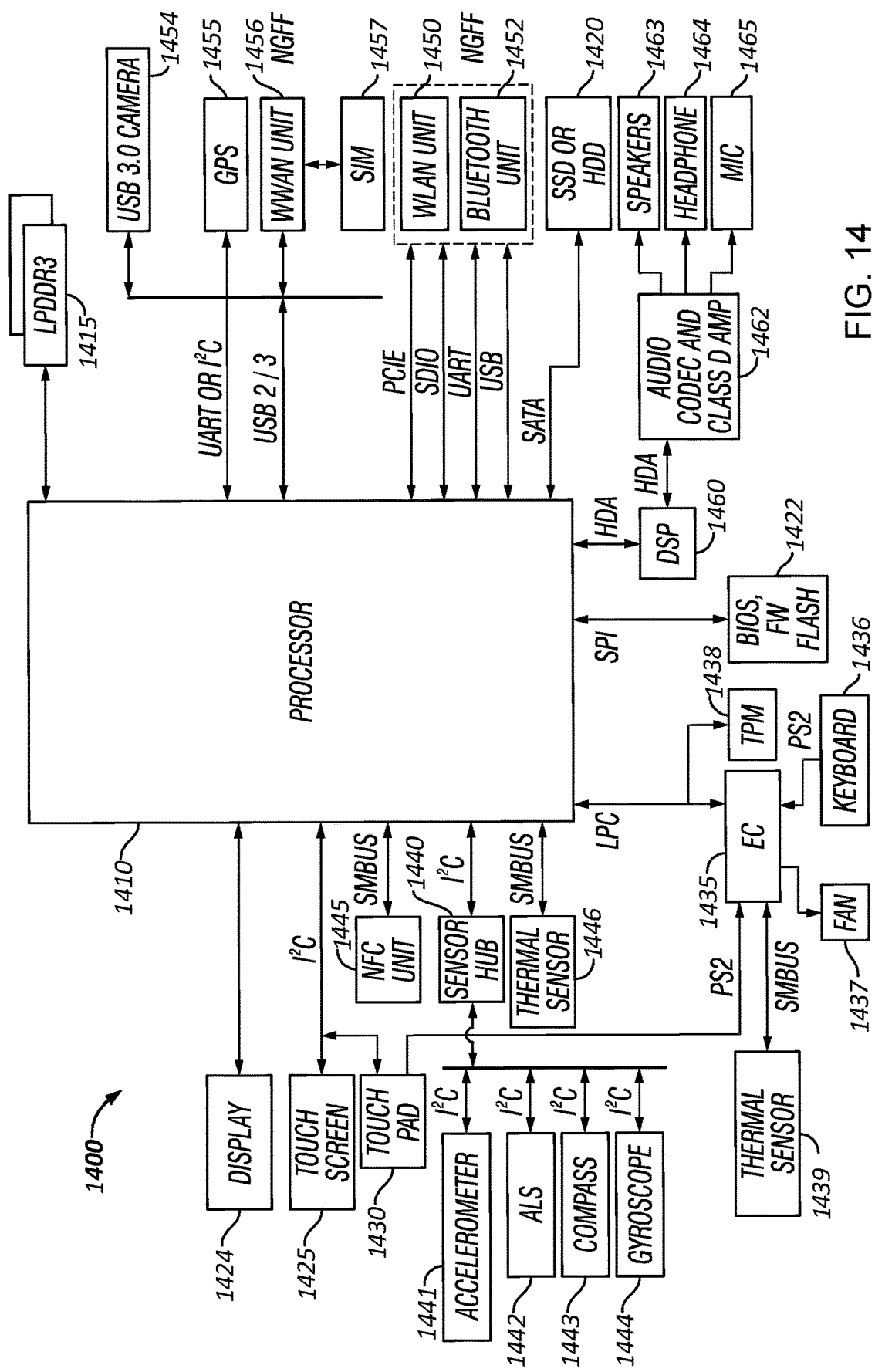
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC and which may include a power controller as described herein.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I2C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I2C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
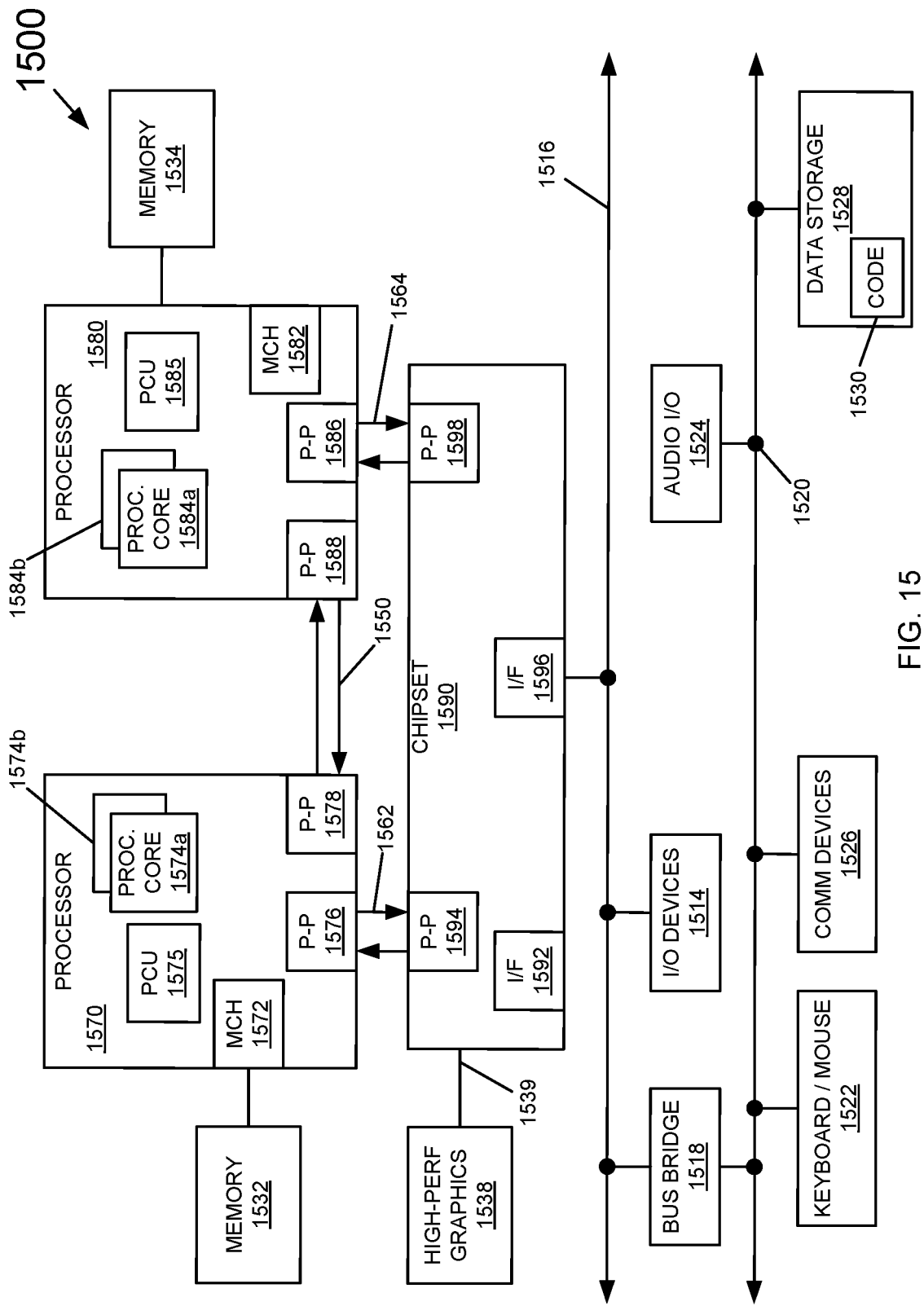
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU 1575, 1585 or other power management logic to perform processor-based power management as described herein. To this end, PCUs 1575 and 1585 include feedback control circuitry to dynamically determine capabilities of corresponding cores and enable such information to be stored and provided to a scheduler such as an OS scheduler, for use in making better scheduling decisions for a heterogeneous processor.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
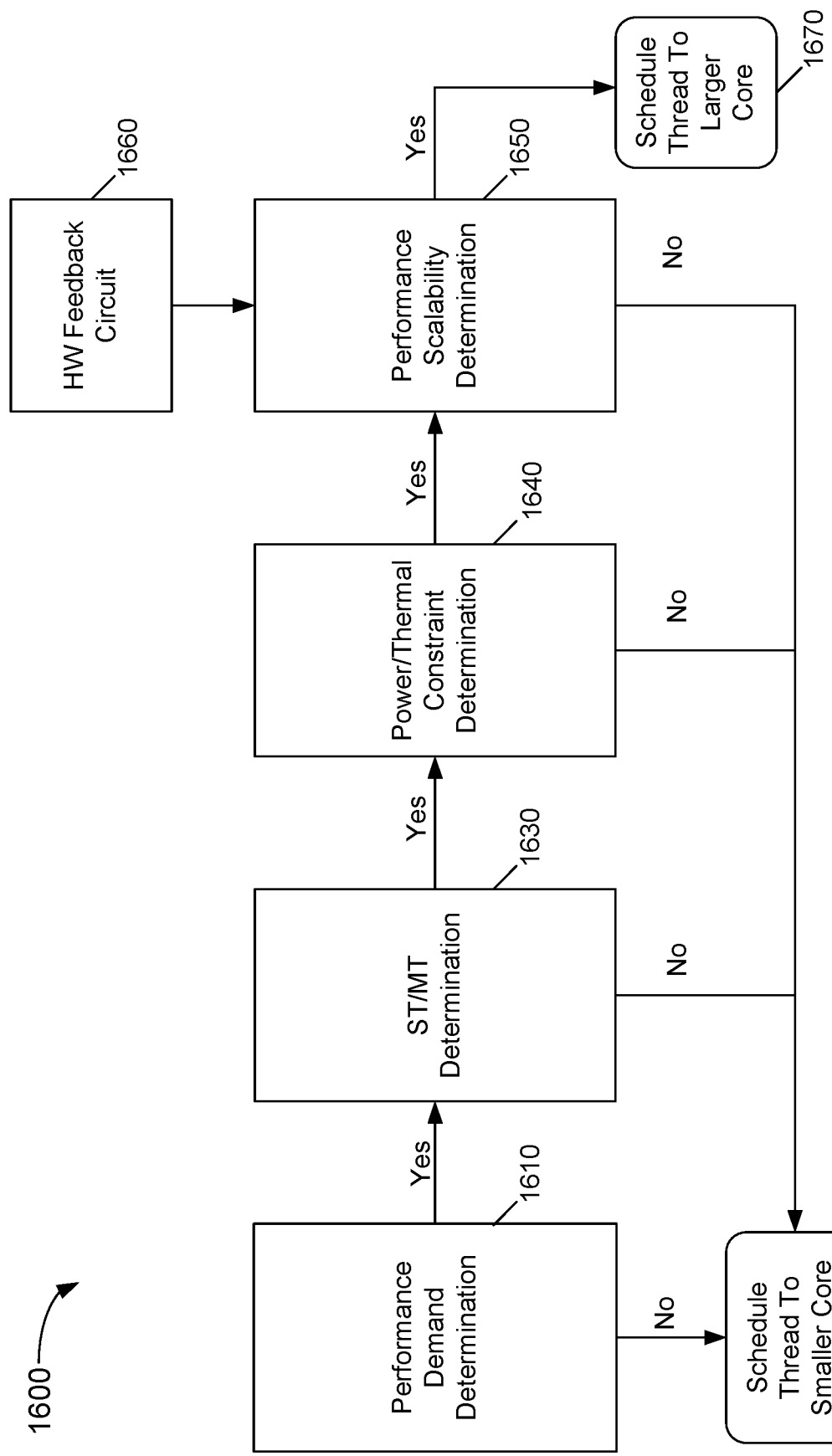
FIG. 16 is a flow diagram of a scheduling method in accordance with an embodiment.

Referring now to FIG. 16, shown is a flow diagram of a scheduling method in accordance with an embodiment. More specifically, scheduling method 1600 may be performed by an OS to schedule workloads on a heterogeneous SoC that includes cores having different capabilities. In embodiments herein, assume that the SoC includes cores of different power consumption levels, such as at least one large core that operates at higher power consumption levels than one or more low power cores that operate at lower power consumption levels. In various embodiments, these different cores may be of heterogeneous designs. For example, the large core or cores may be implemented as out-of-order cores while the low power cores may be implemented as in-order cores. Of course in other embodiments, all the cores may be in-order or out-of-order cores. In other cases, the heterogeneity may be due to process variations across a die on which the SoC is formed. As yet another example, an SoC may have all homogeneous cores but due to power and thermal constraints, the hardware may throttle a subset of cores more than others and thus create performance heterogeneity between otherwise identical cores. In method 1600, all cores are exposed to the OS scheduler, which is responsible for determining which threads are to be scheduled on which core type.

In an embodiment in which there is a limited amount of large cores (e.g., 1), the main goal of heterogeneous scheduling is to boost performance of responsiveness workloads with a dominant thread. Typically, these workloads have multiple active threads running including those performing background or system management tasks. The goal of the scheduler is to identify the most performance-sensitive thread and schedule it on the large core.

Heterogeneous performance and large core usage may be highly dependent on available power and thermal budget. Given package and system constraints, an SoC may be power and thermally limited under many usage conditions. Therefore, the properties of the different core types may be dynamic. Stated another way, a large core may have higher performance than a small core when it is not power or thermally constrained. However, when the core is thermally limited or the SoC is power constrained, the large core performance can be lower than the small core. Heterogeneous scheduling in accordance with an embodiment enables an understanding of these different power and thermal constraints, to enable the scheduler to dynamically determine which core type has higher efficiency and performance at any given point in execution.

Method 1600 may be performed to schedule a thread to a selected core type. As illustrated, method 1600 begins by implementing a performance demand determination (block 1610). This performance demand determination may be based on various information regarding threads, such as utilization information, type of thread (e.g., foreground versus background), latency, priority and so forth. More specifically, the metrics used at block 1610 may include expected thread run time, foreground vs. background activity, thread priority and other special cases such as a low latency profile associated with threads that are known to need responsiveness from the system (e.g., application launch). If based upon the information, it is determined that the given thread is not in need of high performance, control passes to block 1620 where the thread may be scheduled to a smaller (e.g., currently lower power) core as indicated by the hardware feedback.

Otherwise control passes to block 1630 to make a determination of thread dominance. For example, this determination may be whether the thread is a single thread to be in execution or a single dominant thread of an overall workload. If not, control passes to block 1620 for scheduling on a small core. Instead if it is determined that there is a single thread or the thread undergoing scheduling is the dominant thread, control passes to block 1640 to determine whether there is a power and/or thermal constraint on the processor. If so, the thread is scheduled to a low power core (block 1620).

Finally, if it is determined that there is no constraint, control passes to block 1650 where a performance scalability determination may be made. As described herein, this performance scalability determination may be based at least in part on hardware feedback information received from a hardware feedback circuit 1660. In embodiments herein, hardware feedback circuit 1660 may be implemented within a power controller such as a PCU. Of course, the computation of hardware feedback information may be performed in other locations in different embodiments. In any event, at block 1650 a determination as to performance scalability may be made at least in part on this hardware feedback information. If it is determined that the thread is scalable, control passes to block 1670, where it is scheduled to a large (e.g., higher power consuming) core. Otherwise, the thread is scheduled to a lower power core (as currently determined by the hardware feedback) (block 1620). Understand while shown at this high level in the embodiment of FIG. 16, many variations and alternatives of a scheduling method are possible.

In embodiments herein, better scheduling decisions may occur to appropriately schedule threads to achieve higher performance and/or improved power consumption, based on the hardware feedback information. As such, it is possible based upon this hardware feedback information to schedule a thread to a smaller core, where it may achieve greater performance than if it were to be scheduled on a larger core, in some situations. And similarly, it is possible to schedule a thread to a large core and increase energy efficiency, instead of scheduling the thread on a smaller core, in some situations. Note that while only two different core types are described for ease of discussion, in embodiments a given processor or other SoC may include more than two different types of cores that may provide for a range of power consumption levels, compute capacity and so forth.

Figure 17:
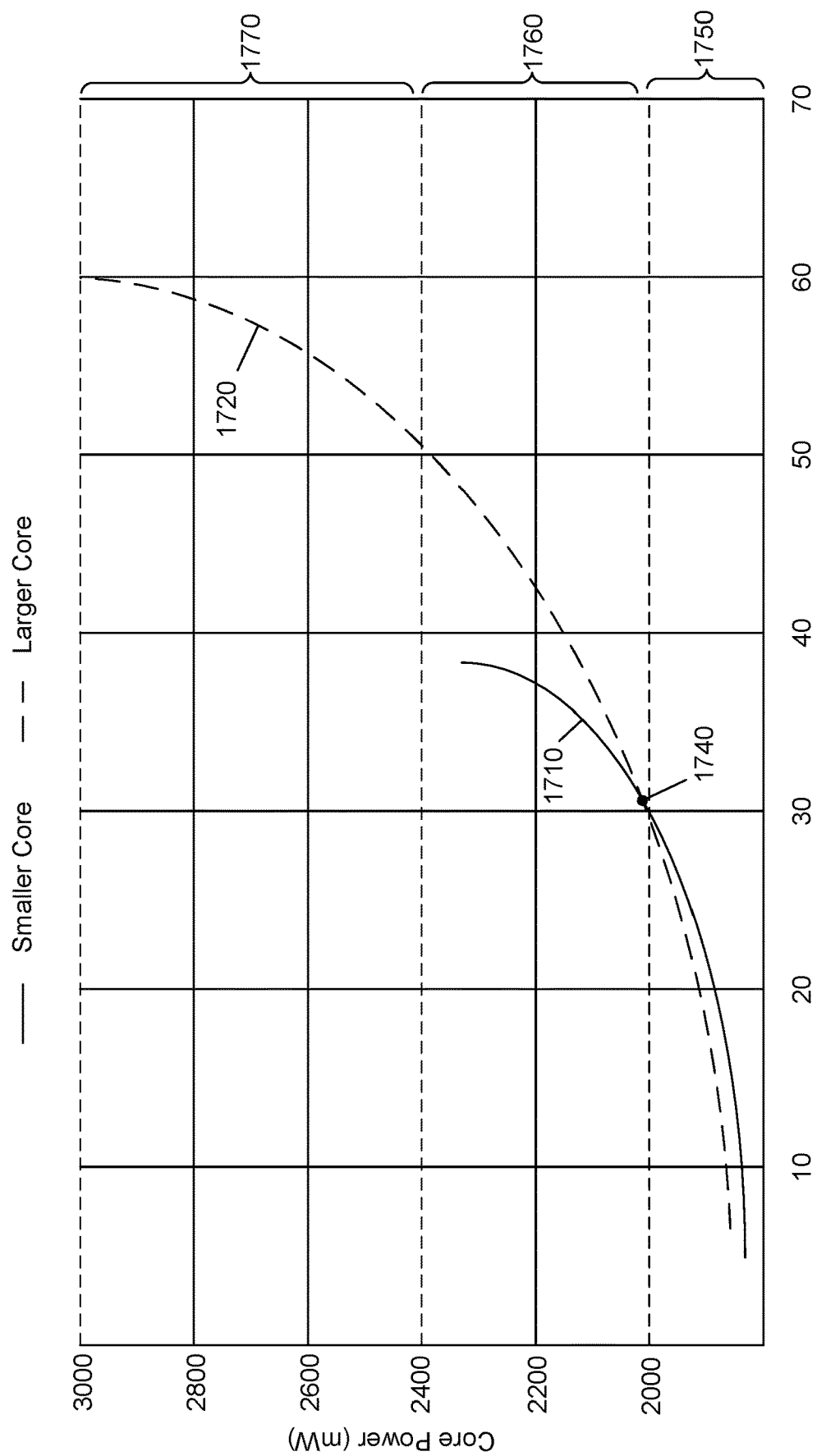
FIG. 17 is a graphical illustration of core power for a variety of workloads, for small and large cores, respectively, in accordance with an embodiment.

Referring now to FIG. 17, shown is a graphical illustration of core power for a variety of workloads, for small and large cores, respectively. As illustrated, curve 1710 is associated with a smaller core and curve 1720 is associated with a larger core. Until a break point 1740, the low power core may execute a given workload at lower power levels than the large core. After break point 1740 however, the smaller core incurs a larger power consumption for less workload output.

More specifically as shown in FIG. 17, in a first region 1750 a low power core may have higher efficiency and performance than a higher power core. Stated another way, in first region 1750, a smaller core is both higher performance and more efficient. Software threads with lower performance requirements that fall into this region may thus be scheduled on smaller cores. In addition, when the SoC is power or thermally limited, a smaller core has higher performance than a larger core. High performance demand software threads may be scheduled on one of the smaller cores in this region. When operating in this region, the OS may schedule work on a larger core only when no other core is available. In a second region 1760, the larger core may have higher efficiency and performance. In second region 1760, a larger core is both higher performance and more efficient than a smaller core, so that in this region, high performance demand threads may be scheduled on a larger core. However, in addition to scheduling performance demand threads on a larger core, other threads that that are to operate in this region may be scheduled on the larger core to improve system efficiency. One example is a graphics workload with a performance requirement that falls in this region. In a third region 1770, the larger core may have higher performance (note that the smaller core cannot operate at the high power level of this third region). In third region 1770, a larger core is higher performance but has lower efficiency than a smaller core. When power/thermal budget is available, a single-threaded (ST)-dominant workload with high performance demand thread may be scheduled on the larger core.

Figure 18:
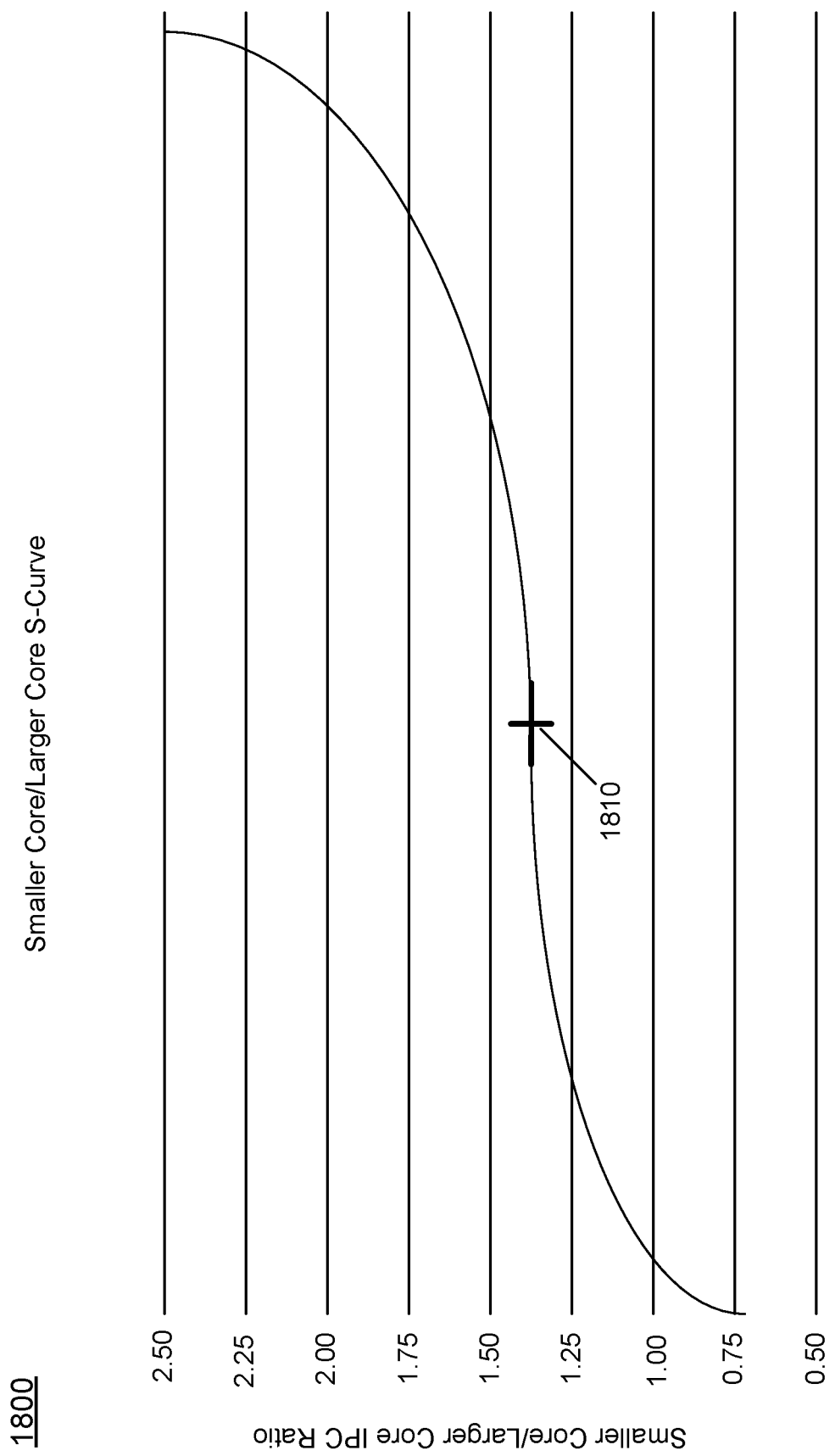
FIG. 18 is a graphical illustration of an S-curve showing a comparison between different core types in accordance with an embodiment.

Referring now to FIG. 18, shown is a graphical illustration of an S-curve showing a comparison between different core types. More specifically, as illustrated in FIG. 18, curve 1800 illustrates a relationship between a performance scalability ratio between a large core and a small core (e.g., in terms of instructions per cycle). As illustrated, at higher workload levels, a higher ratio value is present. Relative performance and efficiency of larger and smaller cores is also workload dependent. It is a function of workload power/performance scalability between larger and smaller cores, the number of active threads in the system and their relative energy-performance priority. Workload scalability in turn defines how workload power and performance (e.g., in terms of IPC) scales between two different core types. Average performance or IPC scaling between larger and smaller cores is 2.0× in illustration 1800. Workloads that have higher performance scalability between larger and smaller will in general move a crossover point 1810 to a lower power envelope while workloads with lower scalability will see crossover between larger and smaller move to higher power levels. The number of active threads and their relative energy-performance priority may determine how available power budget is allocated between different cores and therefore may impact the choice of core type. For example, for a workload with three active threads in which two are background activity and one is performance sensitive foreground activity, more budget may be allocated to a single higher performance core to which the foreground thread is to be scheduled. If all three threads have equal performance demand, power budget allocation between cores may cause scheduling on three small cores.

Figure 19:
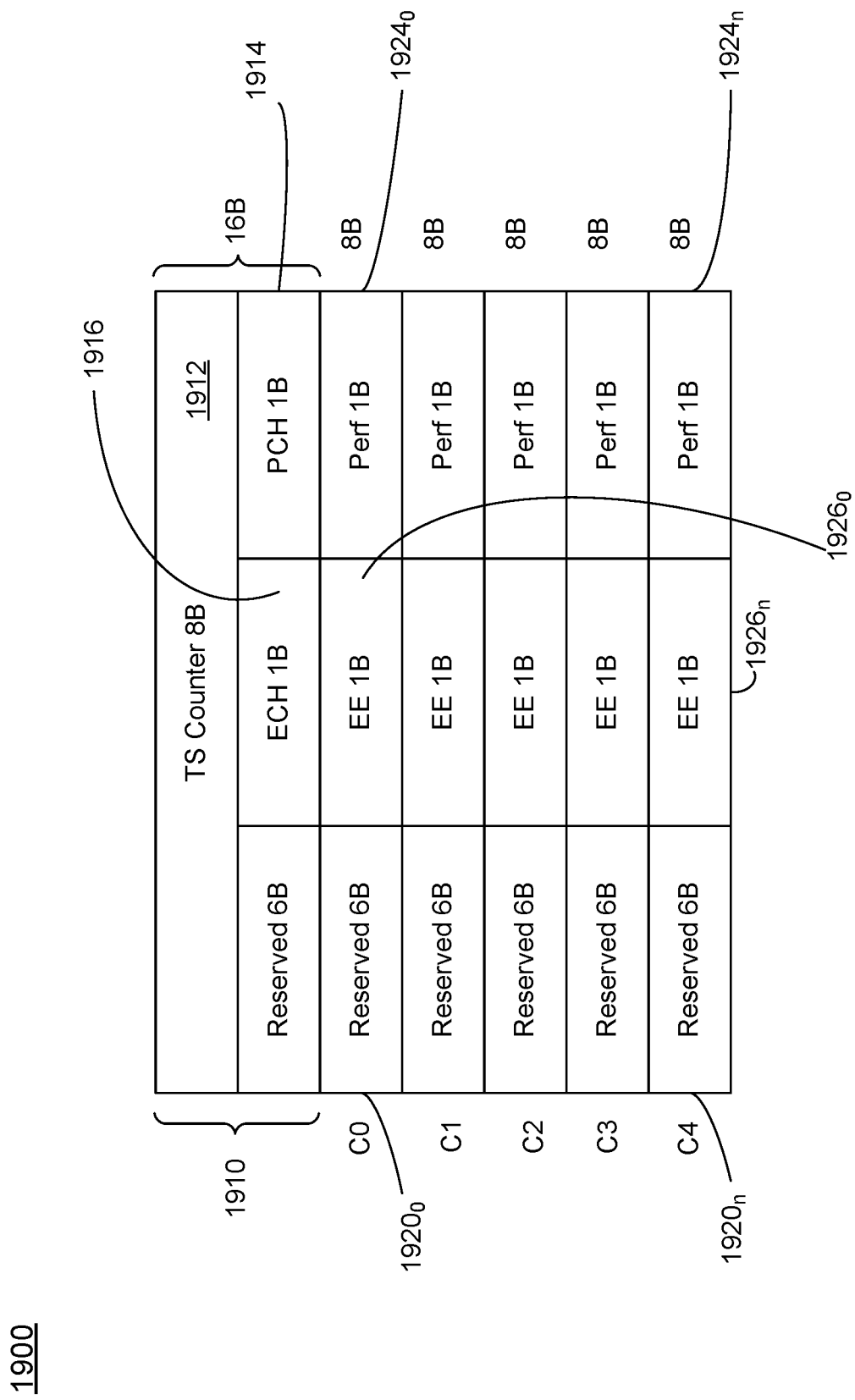
FIG. 19 is a block diagram of a hardware feedback interface structure in accordance with an embodiment.

Referring now to FIG. 19, shown is a block diagram of a hardware feedback interface structure in accordance with an embodiment. More specifically as shown in FIG. 19, structure 1900 is a table or other structure that stores hardware feedback information as described herein. In embodiments, structure 1900 may be a memory-based structure, e.g., stored in a dedicated location within a system memory such as DRAM. In one embodiment, the size of the HFI memory region may be a single 4K memory page, and the OS may allocate one 4 KB page and map it into non-pageable writeback (WB) memory. As illustrated, structure 1900 includes a global portion 1910 that may store information including a timestamp counter 1912 and change indicators. In an embodiment, timestamp counter 1912 may be implemented as an 8 byte (8B) monotonically increasing counter that can be used by the OS to track hardware scheduling updates or for debug purposes. In an embodiment, this counter can be populated with a crystal clock value when the HFI is updated. The OS can convert this counter to a time stamp counter value (TSC) using a given TSC/crystal clock ratio. Also shown, a performance capability changed indicator 1914 and an energy efficient capability change indicator 1916 may be included within global portion 1910. In an embodiment, performance capability changed (PCH) indication 1914 is a 1 bit value that when set to 1 indicates that the performance capability for some core has changed. In an embodiment, energy efficiency capability changed (ECH) indication 1916 is a 1 bit value that when set to 1 indicates that the energy efficiency capability for some core has changed. The rest of the global area may be reserved for future capabilities.

As further illustrated in FIG. 19, structure 1900 also includes a plurality of core-based portions 1920$_0$-1920$_n$. In an embodiment, each core storage entry 1920 may be associated with a given logical processor and may store information including a corresponding performance capability 1924 and a corresponding energy efficiency capability 1926 for the corresponding core. In an embodiment, each core storage entry 1920 may be an 8 byte entry including the following fields for each physical core: performance (Perf) (1B), namely the current performance capability of a logical processor; energy efficiency (EE) (1B), namely the current energy efficiency capability of a logical processor; and a reserved portion.

In an embodiment, the hardware feedback interface is memory based. During initialization, the OS may enumerate hardware feedback support. If hardware feedback is supported, the OS allocates a hardware feedback interface (HFI) memory region as a non-paged contiguous memory. Once this memory region is allocated, the OS writes its physical address (PA) in a pointer register, and updates indicators in various registers (such as one or more model specific registers (MSRs)) to cause the hardware to begin hardware feedback operation as described herein.

Once hardware feedback is enabled, a power controller generates hardware feedback information updates based on system workload and power and thermal constraints. In one embodiment, a microcode technique may be used to write the updates to memory, which may be in a compressed form as described herein. When new hardware feedback information is available, the power controller may use a mailbox interface to request microcode to update the HFI memory region with the latest hardware scheduling information. Microcode reads the new information and writes it to memory using the layout of the HFI region. In another embodiment, the power controller may write the memory directly. A still further embodiment may be where the HFI table is located in a set of memory mapped control registers (e.g., within the power controller).

Various package level status/interrupt MSRs may be used to control access to the HFI memory region and OS notifications. In an embodiment, a hardware feedback notification log indicator of a package thermal status MSR may be used to control access to HFI memory and provide the OS with status of hardware feedback updates. This indicator may be set by hardware when a change to the hardware feedback information has occurred and been written to memory. This set indicator is to inform the OS of an atomic update to the HFI memory region, and that it will not be written to again until the OS clears the indicator.

When the hardware feedback notification log indicator is set, the OS can access the memory region to obtain new hardware feedback information. The OS then clears this indicator after reading HFI memory so that a new power or energy efficiency order change will cause the power controller to update the HFI memory and set this indicator again. When this indicator is cleared, hardware owns the hardware feedback memory region and information stored there is not guaranteed to be atomic or consistent. As such, the OS may not read or access HFI memory when the hardware feedback notification log indicator is cleared. In some embodiments, hardware feedback updates may be controlled to occur no more than once per given interval (e.g., 10 ms) and only when hardware feedback has meaningfully changed.

In embodiments, notification events may be provided to notify the OS that there is a change to hardware feedback processor capabilities and a new update to HFI memory region is available. As one example mechanism, a hardware feedback notification enable indicator may be included in a package thermal interrupt MSR to enable hardware feedback notifications. When this indicator is set, a hardware feedback notification is generated when the hardware feedback notification log indicator in the package thermal status MSR changes polarity. Note that the OS can use the hardware feedback notification log indicator for flow control. If hardware feedback updates and notifications are too frequent for the OS to process and use for scheduling, the OS can delay clearing the hardware feedback notification log indicator, thus preventing further hardware feedback updates and notifications.

The per logical processor capability information may be accessed based on enumeration through a mechanism like a CPUID register to identify the index of logical processor's entry or row in the HFI memory containing processor capability information. The OS uses this index to create a mapping between logical processor IDs and indexes into hardware feedback capability information.

In operation, the OS may clear the hardware feedback notification log indicator in the package thermal status MSR to request a hardware feedback update and set hardware feedback notification enable indicator in the package thermal interrupt MSR if it wants to receive hardware feedback notifications. Once the status and notification indicators are set, the OS sets an enable indicator in a hardware feedback configuration MSR. This set indicator is a trigger to cause hardware to begin computing hardware feedback as described herein. When a change in one of the processor capabilities occurs, the power controller updates the HFI memory region pointed to by the hardware feedback pointer MSR and generates a notification to the OS.

Figure 20:
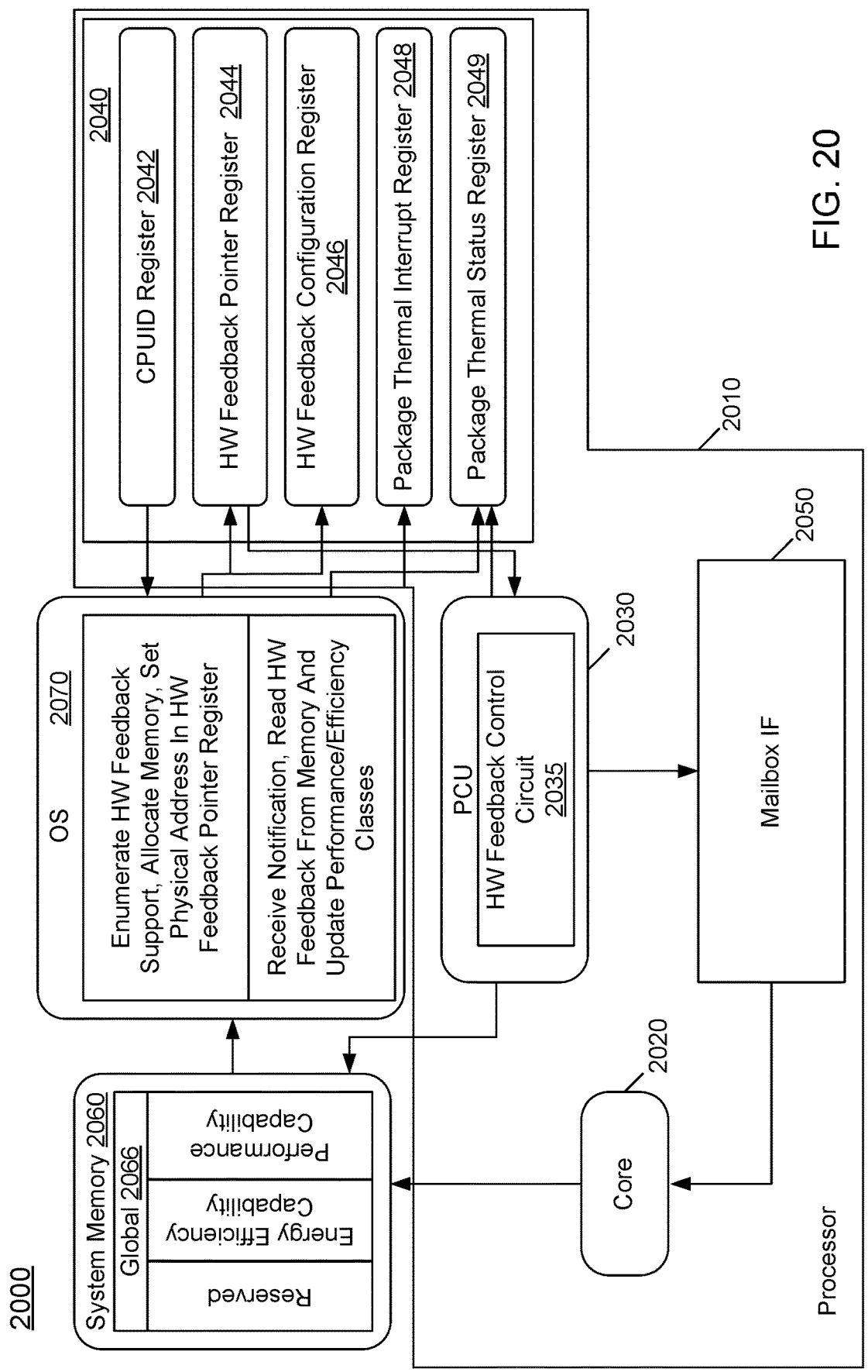
FIG. 20 is a block diagram of a system arrangement in accordance with an embodiment.

Referring now to FIG. 20, shown is a block diagram of a system arrangement in accordance with an embodiment. As illustrated in FIG. 20, system 2000 includes a processor 2010 which may be, in an embodiment, a heterogeneous multicore processor that couples to a system memory 2060 implemented as a DRAM, in one embodiment. As further illustrated, an OS 2070 executes on processor 2010. Processor 2010 includes at least a single core 2020 shown for representative purposes. Core 2020 couples to a PCU 2030 via a mailbox interface 2050 which, in an embodiment may be implemented as a microcode mailbox interface. Of course other interfaces to enable communication between core 2020 and PCU 2030 are possible.

As further illustrated, processor 2010 also includes a set of registers 2040. Registers 2040 may include a variety of MSRs, status registers, configuration registers and so forth. In the particular embodiment shown in FIG. 20, such registers include a CPUID register 2042. Of interest, CPUID register 2042 may include a hardware feedback field which when set indicates that the processor is capable of providing dynamic hardware feedback information to an OS. A hardware feedback pointer MSR 2044 may include a hardware feedback pointer field to store a pointer, written by the OS, to point to the location in memory in which the hardware feedback information structure is to be stored. A hardware feedback configuration MSR 2046 may store a hardware feedback configuration enable field which, when set, indicates that the processor is to perform hardware feedback processing as described herein. A package thermal interrupt register 2048 may include a hardware feedback notification enable indicator to enable triggering of an interrupt in response to an update to the hardware feedback information. And finally, a package thermal status register 2049 may include a hardware feedback notification log indicator, which may be set when updated hardware feedback information is written by PCU 2030, and may be reset by the OS when it reads the updated information.

Still with reference to FIG. 20, PCU 2030 includes a hardware feedback control circuit 2035 which may compute hardware feedback information and trigger a writing of this information to memory 2060. More specifically, this information may be communicated via mailbox interface 2050 to core 2020. In turn, microcode of core 2020 may receive this hardware feedback information and write it to system memory 2060 and thereafter send an acknowledgement to PCU 2030 of the writing of this information.

Note that in other embodiments, a direct interface may be provided to enable PCU 2030 to directly write this hardware feedback information to system memory 2060. In embodiments, prior to actually being written to memory, the hardware feedback information may be temporarily cached as writeback information, e.g., in a last level cache of the processor. As such, OS 2070 may access the hardware feedback information either from the LLC if present therein or from memory 2060. Understand while shown at this high level in the embodiment of FIG. 20, many variations and alternatives are possible.

Figure 21:
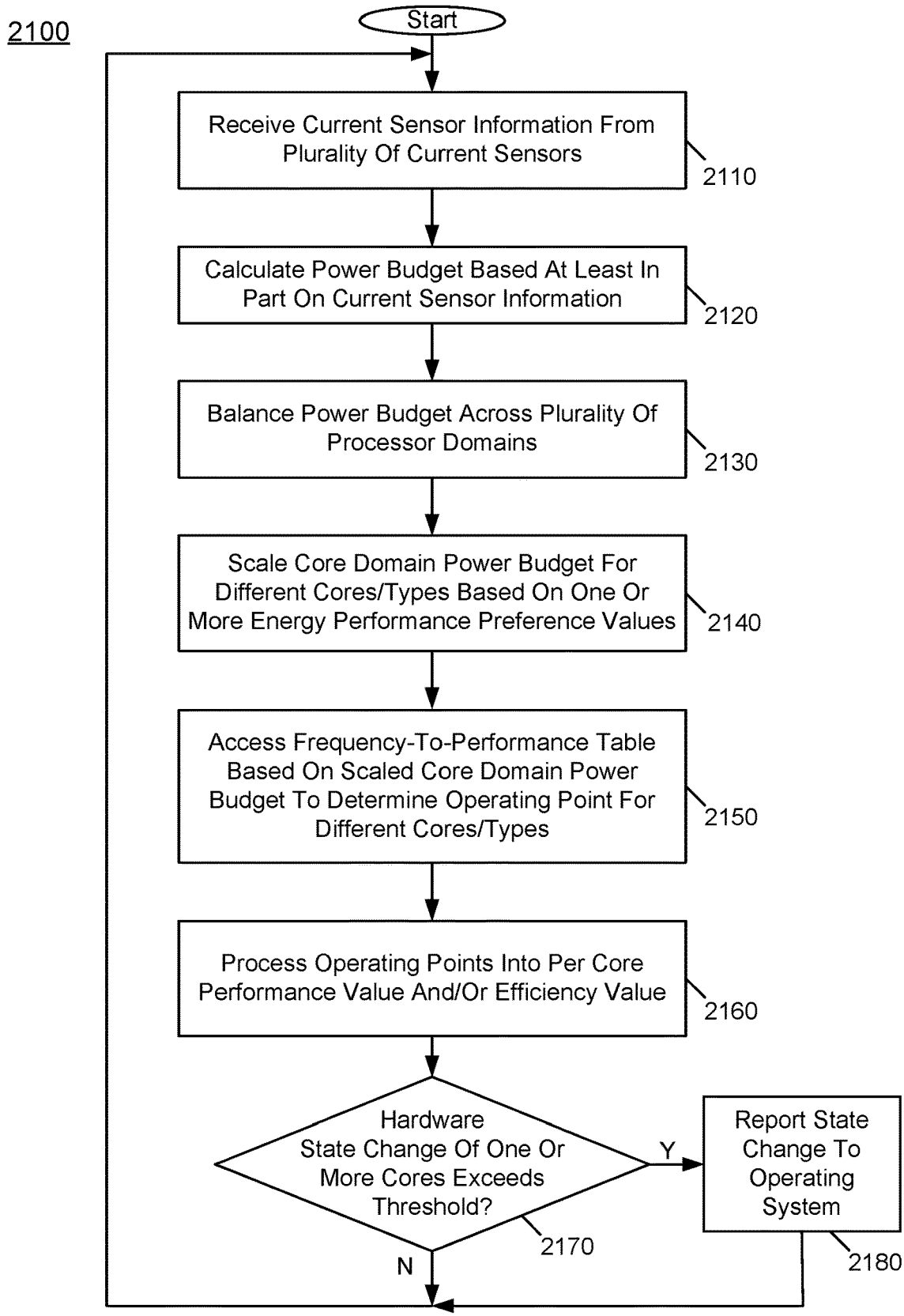
FIG. 21 is a flow diagram of a method in accordance with an embodiment of the present invention.

Referring now to FIG. 21, shown is a flow diagram of a method in accordance with an embodiment of the present invention. As shown in FIG. 21, method 2100 is a method for performing resource allocation between heterogeneous cores of a multicore processor and providing hardware feedback information to an operating system in accordance with an embodiment. As such, method 2100 may be performed by hardware circuitry, firmware, software and/or combinations thereof. In a particular embodiment, method 2100 may be performed at least in part using circuitry present in a power controller of the processor.

As illustrated, method 2100 begins by receiving current sensor information from a plurality of current sensors (block 2110). As an example, each of multiple cores may include a set of current sensors to sense current consumption for a given portion of the core. In turn, these individual current sensors may be coupled together via a dedicated bus such as a push bus. Such current sensors may be associated with one or more counters in each of the cores so that current consumption information may be maintained. In turn, this current consumption information, e.g., in the form of count values from one or more cores as processed during a given evaluation interval, can be provided to the power controller as the current sensor information. This current sensor information thus provides the power controller with accurate information regarding a current consumption level within each of the cores or other processing circuits.

Still with reference to FIG. 21, next at block 2120 a power budget for the processor may be calculated based at least in part on this current sensor information. For example, based on the determined current consumption level and operating points of the different cores and other circuitry of the processor, an actual power consumption level can be determined. In turn this power consumption level may be compared to a configured power level, such as a thermal design power (TDP) level. From such information, a power headroom can be determined. More specifically, at block 2120 the power controller can determine a total power budget for the multicore processor. In example embodiments, note this total power budget may not be in terms of an actual power level such as Watts. Instead it is possible for this value to be a unitless value.

Next control passes to block 2130, where this power budget is balanced across multiple processor domains. Note that the processor domains may be segregated at a relatively high level, and may include, in one embodiment, four different processor domains, namely a core domain, a graphics domain, an interconnect domain, and an uncore domain, each of which may be allocated with a portion of the overall power budget. As one such example, based upon configuration information, either provided statically or dynamically by a user, operating system or other scheduling entity, each of these processor domains may be allocated a given portion of the overall power budget. Understand that based on these allocated power budgets, the power controller or other control circuitry may control operating points of the individual processor domains.

The power controller may allocate appropriate independent budgets to heterogeneous cores of the processor. With a heterogeneous core design as herein, simply allocating this core power budget equally to the different cores may result in inefficiency and lower performance and/or higher power consumption. Instead with embodiments herein, knowledge of the dynamic capabilities of these heterogeneous cores can be considered in allocating power among the different core types and/or cores. As such, at block 2140 the power controller may scale the core domain power budget for different cores/core types based on one or more energy performance preference values. In an embodiment, these energy performance preference (EPP) values may be so-called EPP hints received by way of one or more configuration registers. In various embodiments such EPP information may be provided on a package, core or thread-level basis, to indicate preference of a user for a given value of a range of values between a highest performance level or highest energy savings. Note that there may be different EPP values associated with different cores/core types.

Still with reference to FIG. 21, control passes to block 2150, where a power-to-performance table may be accessed based on the scaled core domain power budget for each of the different cores/core types to determine an operating point for each of the different cores/core types. Note that this operating point may include at least one of frequency and voltage. Also understand that at this point in the power management process, this operating point is a maximum performance point that each core or core type can support during a next execution interval (also referred to herein as a next execution cycle). However based on further processing as described herein, it is possible for this operating point to be optimized or reduced to a lower level in light of physical or environmental constraints, as examples.

In an embodiment, this power-to-performance table may include a plurality of entries, each of which may be accessed using an EPP value as an index into the table. Each such entry may include at least a portion of an operating point (e.g., a frequency) for each of the different core types. As such, this table provides an indication of the heterogeneous nature of cores, such that the table expresses architectural differences between cores in terms of, e.g., voltage/frequency characteristics, power delivery constraints, static power/performance capabilities of cores and so forth. Thus even where different cores are associated with a common EPP value, different operating points may be determined for the different cores/core types based on the information in this power-to-performance table.

As described below, these operating points can be used to set appropriate voltage and frequency for the different cores/core types for the next execution cycle. In addition, this information may be further processed and considered for communicating updated hardware feedback information to an OS scheduler, as described herein.

With further reference to FIG. 21, control next passes to block 2160 where these operating points can be processed into per core performance values and/or per core efficiency values. As such, at block 2160 raw per core performance points are received as input and are interpreted into performance/efficiency measures. In an embodiment, hardware state feedback information may be implemented as a data structure having two vectors: performance and efficiency, where each vector represents a sorted list of enumerated cores with respect to relative performance and efficiency.

Next control passes to diamond 2170 where it may be determined whether a hardware state change has occurred to one or more cores or core types that exceeds a threshold. In an embodiment, this determination may be based upon the determined per core performance values and/or efficiency values and one or more threshold values. As such at diamond 2170, continuous tracking of changes in power/thermal capabilities can be determined, to enable meaningful feedback to be generated for the OS. Although the scope of the present invention is not limited in this regard, meaningful state change updates can be driven by any change in the performance capabilities of the cores based on present power/thermal budget.

Figure 22:
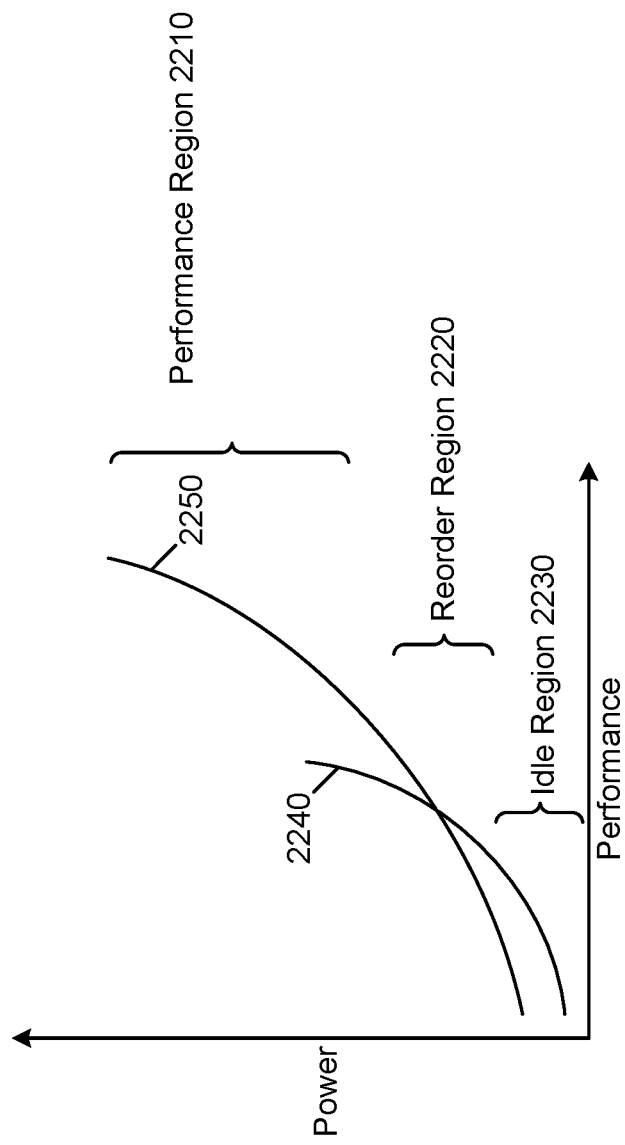
FIG. 22 is a diagram illustrating power versus performance for a processor in accordance with an embodiment.

In one embodiment, relative performance and efficiency capabilities of different core types can be broken down into three regions, as shown in a graph 2200 of power versus performance in FIG. 22. As seen, a first region 2210 is a performance region in which operation may be on one or more high power consuming cores with highest performance. A second region 2220 is a reorder region in which execution may be on one or more smaller cores having higher efficiency and performance. Finally, a third region 2230 is an idle region, in which operation may be on a small core, potentially at its lowest performance state. In addition, FIG. 22 illustrates curves 2240 and 2250 for, respectively, a first heterogeneous core (e.g., a low performance low power core) and a second high performance high power core.

Figures 23, 24:
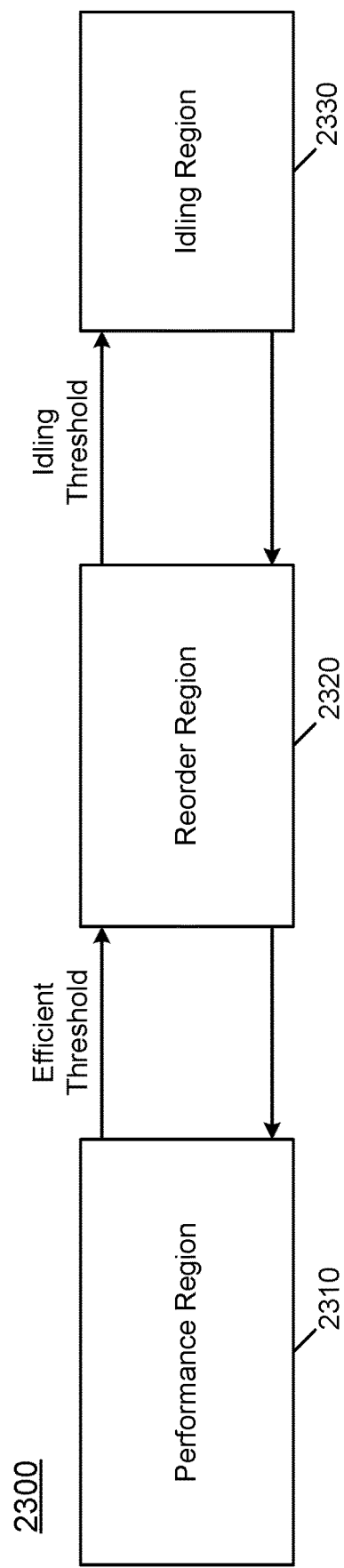
FIG. 23 is a diagram of multiple processor operating regions and thresholds in accordance with an embodiment of the present invention.
FIG. 24 is a block diagram of a power-to-performance table in accordance with an embodiment of the present invention.

The transition point between different regions may be marked by efficiency and idling thresholds, which cause transfers between regions 2310, 2320 and 2330 as shown in FIG. 23, which is a diagram of multiple regions and thresholds in accordance with an embodiment. As shown in FIG. 23, in a performance region 2310 a large core has high performance and is more power efficient than a small core for a given workload. In a reorder region 2320, a small core becomes most efficient and a large core is less efficient. And in an idling region 2330, a small core is efficient and a large core is idle. Thus the determination at diamond 2170 may, in an embodiment, track the transition of performance point of the cores from one region in graph 2200 to another and update the status for HGS feedback, in these instances.

Note that in different embodiments, interrupt and polling-based mechanisms may be used for feedback updates. In different cases, various techniques may be used to avoid frequent OS updates. For example, a timer-based technique may be used such that every time an update is pushed to the OS, a timer is initiated and a next update is sent to the OS after the expiry of the timer. The timer duration can be set by software based on the frequency of updates, platform power/performance state change rate, OS interrupt processing overhead, etc. As another example, an averaging-based technique may be used in which feedback is provided based on an averaging of calculated performance/efficiency estimates. In still further cases, a hysteresis-based technique may be used in which bidirectional thresholds serve as a low pass filter, with different thresholds for transitions between two regions to remove frequent transients.

Referring back to FIG. 21, if a hardware state change that exceeds a threshold is identified, control passes to block 2180 where this hardware feedback information may be reported to the OS. With this information the OS scheduler may make better scheduling decisions, e.g., with regard to selection of appropriate core types for handling certain tasks. Instead if no report to the OS is indicated (as determined at diamond 2170), method 2100 may conclude for the current evaluation interval, and control passes back to block 2110 to begin a next evaluation interval. Understand while shown at this high level in the embodiment of FIG. 21, many variations and alternatives are possible.

With embodiments herein, an EPP/software dependence is eliminated, as HGS feedback is computed before performing EPP-based power budgeting. This ensures that even if a thread is scheduled in/out by the OS, the feedback will not change. Thus, HGS feedback provides the present power/thermal state of the system irrespective of the thread scheduled. In embodiments, this feedback includes per core type power/performance metrics. And with resource allocation determinations performed per core type, HGS feedback encompasses all variation due to heterogeneity of the architecture.

In an embodiment, resource allocation between hetero cores may be performed using a lookup table-based technique. In this arrangement a total core power budget may be translated to individual core budgets based on the power/performance differences between different core types. The differences for different core types can be encompassed in a lookup table that reflects variation in operating frequency based on a given power budget. More specifically, a power-to-performance table may be provided. Referring now to FIG. 24, shown is a block diagram of a power-to-performance table 2400 in accordance with an embodiment. As seen in FIG. 24, table 2400 includes a plurality of entries $2410_0$-$2410_N$. As seen, each entry 2410 includes a plurality of fields 2412, 2414 each to store an operating frequency for a particular core type. Of course understand that additional fields may be present to provide frequency information of still other heterogeneous core types. In an embodiment, table 2400 may be indexed using a scaled core domain power budget. As such, by accessing a given entry 2410 of power-to-performance table 2400, a given operating frequency can be identified for each core type.

In an embodiment, table 2400 can be populated in pre-silicon based on optimization objectives (e.g., iso-power, iso-performance, signal thread/multi-thread (ST/MT) performance priority). The values of the table encompass the architectural difference between the cores in terms of VF characteristic, power delivery constraint, static power/performance capabilities of the cores, etc. For example, the different values in the power-to-performance table may reflect compute capabilities of individual cores for a given power budget, assuming homogeneous core types in execution. This table may also be populated for iso-power such that for a given power budget, the table outputs the frequency point of different core types in order to keep individual power consumption same. The calculation can either make static assumptions on the difference in dynamic capacitance (Cdyn) of different core types or dynamically predict Cdyn based on workload execution. The table may also be configured for iso-performance such that for a given power budget, the table outputs the frequency point of different core types in order to keep the performance extracted by different cores the same. This calculation either makes a static assumption on the IPC difference between the cores or takes a dynamic IPC prediction as input to calculate. The table further may be configured for efficiency such that based on the VF and thermal characteristics of the system, the efficient operating point for each core type for a given power budget is different. The LUT entries can be populated to ensure efficient frequency point selection for hetero computation scenarios.

In some embodiments, the table further may be optimized for expected power-performance expectation of the processor, e.g., ST/MT performance, throughput vs. responsiveness objectives, efficiency vs. burst performance. And in further cases, the table may be configured for platform dependence, such that hardware platform constraints restrict the operating points that different core types can run. A most efficient or performance operating point under these scenarios can be computed/tuned and populated in the LUT.

Note that in other embodiments, rather than a lookup table-based resource allocation, allocation of resources between different core types instead may be determined dynamically at runtime. This computation can be controlled by software using knobs to control the relative power-performance bias of different core types.

In some embodiments, a processor may include, e.g., within a power controller, a hardware autonomous power management mechanism. More specifically, some processors provide a power controller having a hardware performance state (P-state)) controller which, in an embodiment, may be implemented in firmware to determine an optimal operating frequency. With embodiments herein, rather than providing a single operating frequency for all cores, a technique may be used to determine an independent optimal operating frequency for each different core or core type, e.g., based at least in part on a utilization target specific for each core type.

In embodiments, a hardware autonomous performance state determination may be used to converge on an EPP-based target utilization point, where there may be different target utilization points for each different core type. To this end, embodiments may include a utilization lookup table to provide different target utilization values for different core types.

Referring now to FIG. 25, shown is a block diagram of a utilization lookup table 2500 in accordance with an embodiment of the present invention. As seen in FIG. 25, table 2500 includes a plurality of entries $2510_0$-$2510_n$. As seen, each entry 2510 includes a plurality of fields 2512, 2514 each to store a target utilization value for a particular core type. Of course understand that additional fields may be present to provide such information of still other heterogeneous core types. In an embodiment, table 2500 may be indexed using an EPP of a presently executing thread. As such, by accessing a given entry 2510 of utilization table 2500, a given target utilization value can be identified for each core type, which may be used by a hardware autonomous control logic to determine operating point.

In an embodiment, this table may be populated by target utilization per core type based on pre/post-silicon tuning and may be stored, in an embodiment, in firmware memory. By providing a utilization table for use in determining hardware-based performance state determinations, an optimal operating frequency point may be determined even where different cores have different performance capabilities in terms of, e.g., instructions per cycle. Note that in other embodiments, target utilization values for different core types can be computed dynamically based on power performance bias or workload types. In such cases, a per core utilization target can be a function of a currently running task and core IPC.

As described herein, performance and efficiency values may be determined in different manners. In some cases, dynamic calculation of these values may be performed based on the different parameters described herein. In other cases, a lookup table-based technique may be performed in which based at least in part on performance (e.g., frequency*IPC) and energy efficiency (e.g., energy per instruction (EPI)) performance and efficiency values may be obtained. Referring now to FIG. 26, shown are block diagrams of lookup tables in accordance with an embodiment. A first lookup table 2600 may be used to determine an efficiency value. Lookup table 2600 includes a plurality of entries $2610_0$-$2610_N$. As seen, each entry 2610 includes a first field 2612 to store an operating frequency, which may be used as an index into the table, and a second field 2614 to store an efficiency value for the corresponding operating frequency. In an embodiment table 2600 may be implemented per core type. And as shown, operation at higher frequencies leads to higher efficiency values, meaning more efficient operation. A second lookup table 2650 may be used to determine a performance value. Lookup table 2650 includes a plurality of entries $2660_0$-$2660_N$. As seen, each entry 2660 includes a first field 2662 to store an operating frequency, which may be used as an index into the table, and a second field 2664 to store a performance value for the corresponding operating frequency. In an embodiment table 2650 may be implemented per core type. And as shown, operation at higher frequencies leads to higher performance values, meaning more performant operation.

Referring now to FIG. 27, shown is a block diagram of a voltage-frequency lookup table in accordance with an embodiment of the present invention. As shown in FIG. 27, table 2700 includes a plurality of entries $2710_0$-$2710_N$, each including a frequency point and corresponding voltages for different core types. Thus where different core types are differently configured to operate at different voltages for a common frequency point, these different voltages may be provided in fields 2714 and 2716 of a given entry. Note that the table 2700 may be accessed using the determined operating frequency as shown in field 2712 for each of the core types to thus obtain an optimal voltage for each core type. In an embodiment, a frequency selected by a hardware autonomous mechanism for different core types may be used as an index into this voltage-frequency table. Note that in certain embodiments, a LUT as in FIG. 27 only provides approximate voltage levels for given frequency, as final operating point depends on number of other factors like temperature, current limits, etc. In other cases, The table can also be populated by taking these factors also in consideration.

In embodiments in which these different core types couple to a shared voltage rail, the maximum operating voltage may be selected for use in controlling one or more voltage regulators to provide this maximum operating voltage to the shared power rail. And, as described below in regard to FIG. 28, it is possible for the core type associated with the lower determined operating voltage to potentially operate at a higher opportunistic frequency (namely a frequency of a voltage-frequency table that includes an entry for this voltage for the core type). To this end, in addition to heterogeneity of processing cores, the optimality of selected frequency points may depend on platform constraints, such as where different core types share a common voltage rail. Such constraints may be taken into account while selecting a final operating point.

Figure 28:
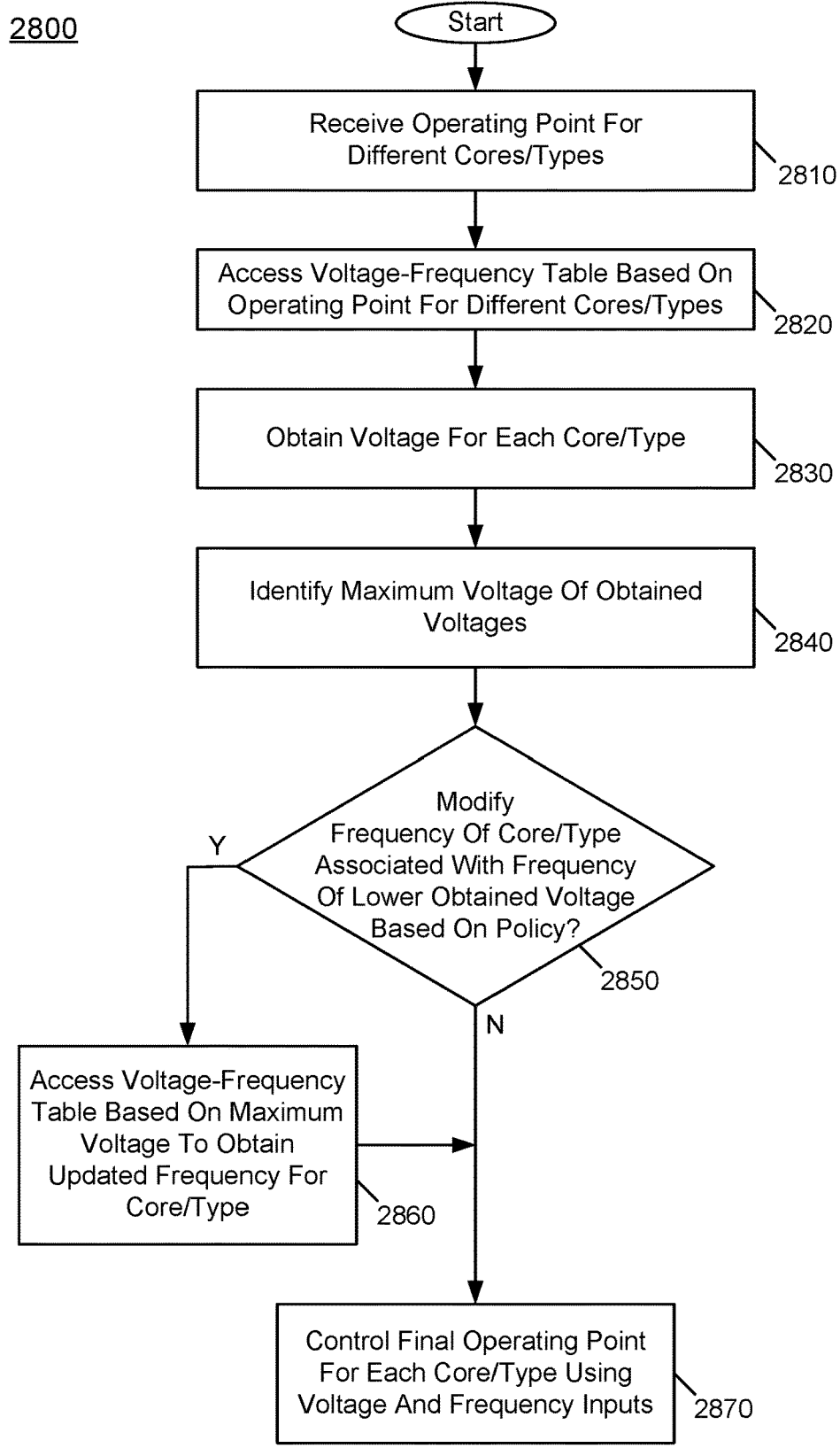
FIG. 28 is a flow diagram of a method in accordance with another embodiment of the present invention.

Referring now to FIG. 28, shown is a flow diagram of a method in accordance with another embodiment of the present invention. More specifically, method 2800 is a method for controlling operating voltage/operating frequency for multiple cores coupled to a common power rail in accordance with an embodiment. As such, method 2800 may be performed at least in part using circuitry present in a power controller of the processor.

As illustrated, method 2800 begins by receiving operating points for different cores and/or core types (block 2810). For example, these operating points (e.g., as determined at block 2150 of FIG. 21) may be provided to a performance control circuit of the power controller, which may use this information in determining an appropriate operating point for the heterogeneous cores for a next execution cycle. Control next passes to block 2820 where a voltage-frequency table may be accessed based on the operating point for each of the different cores types. That is, instead of performing a single access to this voltage-frequency table for all cores, each different core/core type may trigger a different access to this table based on its corresponding operating point. In this way, multiple operating voltages specific to each core type can be accessed.

Still referring to FIG. 28, control next passes to block 2830, where based on the accessed entries of the voltage-frequency table, a voltage can be obtained for each different core or core type. More specifically, this table may include a plurality of entries each including a voltage for different core types for a corresponding operating point (e.g. frequency). As such, a frequency of the operating point can be used to index in the table to obtain a voltage for each of the different core types.

Since this table is accessed with multiple different operating points for different cores or core types, multiple voltages may be obtained. As such, as block 2840 a maximum voltage of the obtained voltages may be identified. Note that this maximum voltage is the highest voltage of the obtained voltages, and is the voltage to be used to control one or more voltage regulators to provide this maximum voltage as the operating voltage to a common voltage rail which powers, potentially, multiple cores, including one or more heterogeneous cores.

Since there may be at least one core that will operate at a higher operating voltage than that obtained for that core, at diamond 2850 it can be determined whether the frequency of this core, namely a core associated with a lower obtained voltage, may be modified. In an embodiment, policy information may be considered in determining whether to allow the frequency of this core or core type associated with the lower obtained voltage to be modified. As examples, these policies may include a management performance demand policy, an efficiency policy and/or a workload demand-based policy. With a maximum performance demand policy, the operating points for all cores is set equal to the maximum performance demanding core type. This policy assumes performance as the driving metric. With an efficiency policy, the operating point is set as a maximum feasible frequency for each core, given the maximum voltage. This policy sets the most efficient operating point for cores, and assumes all tasks will race to halt quickly. With a workload demand policy, operating points are selected based on energy efficiency and/or performance demands of the workload on each core type. For example, in a scenario where all cores share the same voltage rail, running an idle loop at a highest feasible frequency will only waste power budget. Hence this core may run at a lowest possible frequency point. Instead a compute task can race to halt faster by running at a highest feasible frequency point, and hence save power by entering sleep states. Such distinction between the workload demands on each core can be derived either by a hardware algorithm or as an input from the OS.

If it is determined to modify the frequency, control passes to block 2860 where the voltage-frequency table may be again accessed based on the maximum voltage. More specifically, the maximum voltage can be used to access an entry of the voltage-frequency table associated with this maximum voltage for the core to have a changed frequency. Then from this entry, an updated frequency for this core type, namely a higher operating frequency, can be obtained.

In any event, from both diamond 2850 (if no modification is indicated based on the policy information) or block 2860, control passes to block 2870. At block 2870, each core or core type is controlled to operate at a final operating point using the determined voltage and frequency inputs. As such, the power controller may send appropriate control signals to cause clock generation circuitry to provide each core or core type with a clock signal at the final determined operating frequency level, and to cause voltage generation circuitry (including one or more voltage regulators) to provide cores or core types with an operating voltage at the final determined operating voltage level. Understand while shown at this high level in the embodiment of FIG. 28, many variations and alternatives are possible.

The following examples pertain to further embodiments.

In one example, a processor includes: a first core having a first size and to operate at a first power consumption level; at least one second core having a second size and to operate at a second power consumption level, the first size greater than the second size and the first power consumption level greater than the second power consumption level; and a power controller including a resource allocation circuit. The resource allocation circuit is to: receive a power budget for the first core and the at least one second core and scale the power budget based at least in part on at least one energy performance preference value to determine a scaled power budget; determine a first maximum operating point for the first core and a second maximum operating point for the at least one second core based at least in part on the scaled power budget; determine a first efficiency value for the first core based at least in part on the first maximum operating point for the first core and a second efficiency value for the at least one second core based at least in part on the second maximum operating point for the at least one second core; and report a hardware state change to an operating system scheduler based on the first efficiency value and the second efficiency value.

In an example, the power controller is to report the hardware state change when the hardware state change exceeds a threshold and otherwise to not report the hardware state change.

In an example, the threshold comprises a change in an operating region of the processor between a first performance/efficiency region and a second performance/efficiency region.

In an example, the operating system scheduler is to: schedule a first workload to the first core when the hardware state change indicates the first performance/efficiency region comprising a performance region; and schedule the first workload to the at least one second core when the hardware state change indicates the second performance/efficiency region comprising a reorder region.

In an example, the power controller is to report the hardware state change after a predetermined time since a last report of the hardware state change to the operating system scheduler.

In an example, the power controller further comprises a voltage control circuit to determine a first operating voltage for the first core and a second operating voltage for the at least one second core, and control a common voltage regulator coupled to the first core and the at least one second core to operate at a maximum operating voltage of the first operating voltage and the second operating voltage.

In an example, the power controller further comprises a frequency control circuit to receive policy information and based at least in part on the policy information, to increase an operating frequency of the one of the first core and the at least one second core associated with a minimum one of the first operating voltage and the second operating voltage.

In an example, the power controller further comprises a plurality of tables comprising: a first table including a plurality of first entries each including at least a portion of an operating point for the first core and at least a portion of an operating point for the at least one second core, the first table to be indexed using the scaled power budget; a second table including a plurality of second entries each including a target utilization for the first core and a target utilization for the at least one second core, the second table to be indexed using an energy performance preference value associated with at least one thread; and a third table including a plurality of third entries each including an operating voltage for the first core and an operating voltage for the at least one second core, the third table to be indexed using an operating frequency determined for at least one of the first core and the at least one second core.

In an example, the power controller is to: calculate a processor power budget based at least in part on current sensor information; and balance the processor power budget into a plurality of processor domain power budgets including the power budget for the first core and the at least one second core.

In another example, a method comprises: obtaining a value of a first operating voltage for a first core of a processor including the first core and at least one second core, from a voltage-frequency table based on a first operating point determined for the first core; obtaining a value of a second operating voltage for the at least one second core, from the voltage-frequency table based on a second operating point determined for the at least one second core, the second operating voltage less than the first operating voltage; causing a voltage regulator coupled to a common power rail to provide the first operating voltage to the common power rail coupled to the first core and the at least one second core; and causing a clock generation circuit coupled to the at least one second core to provide a clock signal at a second operating frequency to the at least one second core, the second operating frequency different than an operating frequency of the second operating point.

In an example, the method further comprises determining to cause the clock generation circuit to provide the clock signal at the second operating frequency based on policy information to indicate that the at least one second core can operate at an opportunistic operating frequency.

In an example, the method further comprises: preventing the clock generation circuit from providing the clock signal at the second operating frequency based on policy information to prevent the at least one second core from operating at an opportunistic operating frequency; and causing the clock generation circuit to provide the clock signal at the operating frequency of the second operating point to the at least one second core.

In an example, the method further comprises: accessing a first entry of the voltage-frequency table based on the first operating point to obtain the value of the first operating voltage for the first core; and accessing another entry of the voltage-frequency table based on the value of the first operating voltage to obtain the second operating frequency.

In an example, the method further comprises reporting hardware state change information to an operating system scheduler, the hardware state change information comprising at least one of an efficiency value and a performance value for the first core and the at least one second core.

In an example, the method further comprises: determining the efficiency value for the first core based at least in part on the first operating point determined for the first core; and determining the efficiency value for the second core based at least in part on the second operating point determined for the second core.

In an example, the method further comprises: determining the performance value for the first core based at least in part on the first operating point determined for the first core; and determining the performance value for the second core based at least in part on the second operating point determined for the second core.

In an example, the method further comprises accessing a lookup table with at least a portion of the first operating point determined for at least one of the first core and the second operating point determined for the second core to determine the efficiency value for the first core and the efficiency value for the second core.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system comprises a processor having: a first core having a first size and to operate at a first power consumption level; at least one second core having a second size and to operate at a second power consumption level, the first size greater than the second size and the first power consumption level greater than the second power consumption level; and a power controller including a resource allocation circuit. The resource allocation circuit is to: receive a power budget for the first core and the at least one second core and scale the power budget based at least in part on at least one energy performance preference value to determine a scaled power budget; determine a first operating point comprising a first operating frequency and a first operating voltage for the first core and a second operating point comprising a second operating frequency and a second operating voltage for the at least one second core based at least in part on the scaled power budget, the first operating voltage greater than the second operating voltage; cause a voltage regulator coupled to a common power rail to provide the first operating voltage to the common power rail, the common power rail coupled to the first core and the at least one second core; and cause a clock generation circuit coupled to the at least one second core to provide a clock signal at a third operating frequency to the at least one second core, the third operating frequency different than the second operating frequency. The system may further include a dynamic random access memory coupled to the processor.

In an example, the power controller is to: determine a first efficiency value for the first core based at least in part on the first operating point for the first core and a second efficiency value for the at least one second core based at least in part on the second operating point for the at least one second core; and report a hardware state change to an operating system scheduler based on the first efficiency value and the second efficiency value when the hardware state change exceeds a threshold, and otherwise to not report the hardware state change.

In an example, the power controller is to receive policy information and based at least in part on the policy information, to cause the clock generation circuit to provide the third operating frequency to the at least one second core.

In an example, the power controller is to receive second policy information and based at least in part on the second policy information, to cause the clock generation circuit to provide the second operating frequency to the at least one second core, the third operating frequency comprising an opportunistic operating frequency, the second policy information to prevent the at least one second core from operation at the opportunistic operating frequency.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a first core having a first size and to operate at a first power consumption level;
    at least one second core having a second size and to operate at a second power consumption level, the first size greater than the second size and the first power consumption level greater than the second power consumption level; and
    a power controller coupled to the first core and the at least one second core, the power controller to:
        receive a power budget for the first core and the at least one second core and scale the power budget based at least in part on at least one energy performance preference value to determine a scaled power budget;
        determine a first operating point comprising a first operating frequency and a first operating voltage for the first core and a second operating point comprising a second operating frequency and a second operating voltage for the at least one second core based at least in part on the scaled power budget, the first operating voltage greater than the second operating voltage;
        cause a voltage regulator coupled to a power rail to provide the first operating voltage to the power rail, the power rail coupled to the first core and the at least one second core; and
        receive policy information and based at least in part on the policy information, cause a clock generation circuit to provide a third operating frequency to the at least one second core, cause the clock generation circuit coupled to the first core and the at least one second core to provide a clock signal at the first operating frequency to the first core and provide another clock signal at the third operating frequency to the at least one second core, the third operating frequency different and higher than the second operating frequency.

2. The processor of claim 1, wherein the power controller is to:
    determine a first efficiency value for the first core based at least in part on the first operating point and a second efficiency value for the at least one second core based at least in part on the second operating point; and
    report a hardware state change to an operating system scheduler based on the first efficiency value and the second efficiency value when the hardware state change exceeds a threshold, and otherwise to not report the hardware state change.

3. The processor of claim 1, wherein the power controller is to receive second policy information and based at least in part on the second policy information, to cause the clock generation circuit to provide the second operating frequency to the at least one second core, the third operating frequency comprising an opportunistic operating frequency, the second policy information to prevent the at least one second core from operation at the opportunistic operating frequency.

4. The processor of claim 1, wherein the power controller is to access a voltage-frequency table based on the first operating point to obtain a value of at least the first operating voltage.

5. The processor of claim 1, wherein the power controller is to report hardware state change information to an operating system scheduler, the hardware state change information comprising at least one of an efficiency value and a performance value for the first core and the at least one second core.

6. The processor of claim 5, wherein the power controller is to:
    determine the efficiency value for the first core based at least in part on the first operating point; and
    determine the efficiency value for the at least one second core based at least in part on the second operating point.

7. The processor of claim 6, wherein the power controller is to:
    access a lookup table with at least a portion of the first operating point to determine the efficiency value for the first core; and
    access the lookup table with at least a portion of the second operating point to determine the efficiency value for the at least one second core.

8. A non-transitory machine-readable medium having stored thereon instructions, which if performed by a machine cause the machine to perform a method comprising:
    obtaining a value of a first operating voltage for a first core of a processor including the first core and at least one second core, from a voltage-frequency table based on a first operating point determined for the first core;
    obtaining a value of a second operating voltage for the at least one second core, from the voltage-frequency table based on a second operating point determined for the at least one second core, the second operating voltage less than the first operating voltage;
    causing a voltage regulator coupled to a common power rail to provide the first operating voltage to the common power rail, the common power rail coupled to the first core and the at least one second core; and
    causing a clock generation circuit coupled to the first core and the at least one second core to:
        based at least in part on policy information, provide a clock signal at a second operating frequency to the at least one second core, the second operating frequency different and higher than an operating frequency of the second operating point; and concurrently provide another clock signal at the first operating frequency to the first core.

9. The non-transitory machine-readable medium of claim 8, wherein the method further comprises determining to cause the clock generation circuit to provide the clock signal at the second operating frequency based on the policy information to indicate that the at least one second core can operate at an opportunistic operating frequency.

10. The non-transitory machine-readable medium of claim 8, wherein the method further comprises:
preventing the clock generation circuit from providing the clock signal at the second operating frequency based on second policy information to prevent the at least one second core from operating at an opportunistic operating frequency; and
causing the clock generation circuit to provide the clock signal at the operating frequency of the second operating point to the at least one second core.

11. The non-transitory machine-readable medium of claim 8, wherein the method further comprises:
accessing a first entry of the voltage-frequency table based on the first operating point to obtain the value of the first operating voltage for the first core; and
accessing another entry of the voltage-frequency table based on the value of the first operating voltage to obtain the second operating frequency.

12. The non-transitory machine-readable medium of claim 8, wherein the method further comprises reporting hardware state change information to an operating system scheduler, the hardware state change information comprising at least one of an efficiency value and a performance value for the first core and the at least one second core.

13. The non-transitory machine-readable medium of claim 12, wherein the method further comprises:
determining the efficiency value for the first core based at least in part on the first operating point determined for the first core; and
determining the efficiency value for the at least one second core based at least in part on the second operating point determined for the at least one second core.

14. The non-transitory machine-readable medium of claim 12, wherein the method further comprises:
determining the performance value for the first core based at least in part on the first operating point determined for the first core; and
determining the performance value for the at least one second core based at least in part on the second operating point determined for the at least one second core.

15. The non-transitory machine readable medium of claim 14, wherein the method further comprises accessing a lookup table with at least a portion of the first operating point determined for at least one of the first core and the second operating point determined for the at least one second core to determine the efficiency value for the first core and the efficiency value for the at least one second core.

16. A system comprising:
a processor comprising:
a first core having a first size and to operate at a first power consumption level;
at least one second core having a second size and to operate at a second power consumption level, the first size greater than the second size and the first power consumption level greater than the second power consumption level; and
a power controller including a resource allocation circuit to:
receive a power budget for the first core and the at least one second core and scale the power budget based at least in part on at least one energy performance preference value to determine a scaled power budget;
determine a first operating point comprising a first operating frequency and a first operating voltage for the first core and a second operating point comprising a second operating frequency and a second operating voltage for the at least one second core based at least in part on the scaled power budget, the first operating voltage greater than the second operating voltage;
cause a voltage regulator coupled to a common power rail to provide the first operating voltage to the common power rail, the common power rail coupled to the first core and the at least one second core; and
based at least in part on policy information, cause a clock generation circuit coupled to the first core and the at least one second core to provide a clock signal at the first operating frequency to the first core and provide another clock signal at a third operating frequency to the at least one second core, the third operating frequency different and higher than the second operating frequency; and
a dynamic random access memory coupled to the processor.

17. The system of claim 16, wherein the power controller is to:
determine a first efficiency value for the first core based at least in part on the first operating point for the first core and a second efficiency value for the at least one second core based at least in part on the second operating point for the at least one second core; and
report a hardware state change to an operating system scheduler based on the first efficiency value and the second efficiency value when the hardware state change exceeds a threshold, and otherwise to not report the hardware state change.

18. The system of claim 16, wherein the power controller is to receive second policy information and based at least in part on the second policy information, to cause the clock generation circuit to provide the second operating frequency to the at least one second core, the third operating frequency comprising an opportunistic operating frequency, the second policy information to prevent the at least one second core from operation at the opportunistic operating frequency.

* * * * *